US011881749B2

(12) United States Patent
Hazeyama et al.

(10) Patent No.: US 11,881,749 B2
(45) Date of Patent: Jan. 23, 2024

(54) SYNCHRONOUS RELUCTANCE MOTOR

(71) Applicant: Mitsubishi Electric Corporation, Tokyo (JP)

(72) Inventors: Moriyuki Hazeyama, Tokyo (JP); Shinsuke Kayano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 384 days.

(21) Appl. No.: 17/429,944

(22) PCT Filed: Mar. 22, 2019

(86) PCT No.: PCT/JP2019/011967
§ 371 (c)(1),
(2) Date: Aug. 11, 2021

(87) PCT Pub. No.: WO2020/194363
PCT Pub. Date: Oct. 1, 2020

(65) Prior Publication Data
US 2022/0216776 A1 Jul. 7, 2022

(51) Int. Cl.
*H02K 19/10* (2006.01)
*H02K 1/24* (2006.01)

(52) U.S. Cl.
CPC .......... *H02K 19/103* (2013.01); *H02K 1/246* (2013.01); *H02K 2213/03* (2013.01)

(58) Field of Classification Search
CPC ... H02K 19/103; H02K 1/246; H02K 2213/03
USPC ..... 310/156.53, 156.84, 166, 216.066, 261.1
See application file for complete search history.

(56) References Cited

U.S. PATENT DOCUMENTS

| 10,153,670 | B2* | 12/2018 | Büttner | H02K 1/276 |
| 2007/0152527 | A1* | 7/2007 | Yura | H02K 1/246 |
| | | | | 310/156.53 |
| 2017/0110943 | A1* | 4/2017 | Tong | H02K 1/246 |
| 2018/0301948 | A1* | 10/2018 | Hsu | H02K 1/246 |

FOREIGN PATENT DOCUMENTS

JP 2009-77458 A 4/2009

OTHER PUBLICATIONS

International Search Report and Written Opinion dated Jun. 4, 2019, received for PCT Application PCT/JP2019/011967, Filed on Mar. 22, 2019, 10 pages including English Translation.

\* cited by examiner

*Primary Examiner* — Jose A Gonzalez Quinones
(74) *Attorney, Agent, or Firm* — XSENSUS LLP

(57) ABSTRACT

The synchronous reluctance motor includes: an annular stator core having slots; and a cylindrical rotor core-having, for each magnetic pole, slits formed by arc-shaped openings which are convex toward a cylinder center and whose apexes are positioned on a q axis. The nth arc that is an inner edge of the opening close to the cylinder center has an arc center point on the q axis at a distance $D(n)$ from-the rotor core. Where the radius of the nth arc with respect to the arc center point is denoted by $R(n)$ and a ratio $k(n)$ is defined as $D(n)/R(n)$, the values of the ratios $k(1)$ to $k(n)$ are determined such that $0.20 \leq k(n_{max}) \leq 0.37$ and $k(n_{max}) < \ldots < k(n) < \ldots < k(1) < 1$ are satisfied and a slope a is in a range of $(-0.92/n_{max}) \leq a \leq (-0.71/n_{max})$.

20 Claims, 29 Drawing Sheets

FIG. 22

|  | SLIT WIDTH [deg] | | | REMARKS |
| --- | --- | --- | --- | --- |
|  | ANGLE s | ANGLE t | ANGLE u |  |
| MODEL 111 | 3.83 | 3.33 | 2.83 | THE CLOSER TO q-AXIS, THE GREATER SLIT WIDTH IS |
| MODEL 112 | 3.33 | 3.33 | 3.33 | EQUAL SLID WIDTHS |
| MODEL 113 | 2.83 | 3.33 | 3.83 | THE CLOSER TO d-AXIS, THE GREATER SLIT WIDTH IS |
| MODEL 114 | 2.83 | 2.83 | 2.83 | SLID WIDTH < CORE LAYER |
| MODEL 115 | 3.83 | 3.83 | 3.83 | SLID WIDTH > CORE LAYER |

SYNCHRONOUS RELUCTANCE MOTOR

CROSS-REFERENCE TO RELATED APPLICATION

The present application is based on PCT filing PCT/JP2019/011967, filed Mar. 22, 2019, the entire contents of which are incorporated herein by reference.

TECHNICAL FIELD

The present invention relates to a synchronous reluctance motor using reluctance torque.

BACKGROUND ART

A synchronous reluctance motor is used for a railroad vehicle, an air conditioner, an automobile, etc. The synchronous reluctance motor has a slit in a rotor to generate magnetic saliency, and rotates with reluctance torque generated by the magnetic saliency. However, as compared to a permanent magnet synchronous motor having a magnet embedded in a rotor, the synchronous reluctance motor has a problem that output torque is smaller and torque ripple increases due to sharp change in permeance in the vicinity of the slit.

In order to increase output torque of the synchronous reluctance motor, it is necessary to increase the number of slits provided in the rotor and increase the saliency ratio of the motor. Further, the torque ripple mainly has components due to the number of slots of a stator. Therefore, in order to reduce the torque ripple, it is necessary to provide slits with a narrow interval in a rotor core, thereby suppressing harmonic components due to the slots of the stator. Thus, the synchronous reluctance motor is required to achieve both of high output torque and reduced torque ripple.

In view of the above problem, Patent Document 1 discloses a rotor stacked iron core for reluctance motor in which ends of a plurality of arc-shaped slits provided in the stacked iron core and having shapes convex toward a rotary shaft hole side are arranged at equal angular intervals over the entire circumference of an iron core piece.

CITATION LIST

Patent Document

Patent Document 1: Japanese Laid-Open Patent Publication No. 2009-77458

SUMMARY OF THE INVENTION

Problems to be Solved by the Invention

However, the conventional configuration has the following problem.

Patent Document 1 describes a method of reducing torque ripple by arranging the slits in the rotor core at equal angular intervals, but only reduction of torque ripple is considered and the magnitude of output torque is not considered.

In addition, Patent Document 1 describes a method of selecting the slit interval on the basis of a design theory for an induction electric motor. However, in the induction electric motor, slots are provided to a rotor core and secondary conductors are inserted into the slots. Therefore, such a configuration having multiple slots so that the secondary conductors are close to each other is difficult to design in consideration of insulation between the conductors. The selection method for the slit interval of the reluctance motor in Patent Document 1 allows the slits to be arranged at wide intervals, but cannot achieve both of high output torque and reduced torque ripple in such a motor that causes high-frequency torque ripple as in a synchronous reluctance motor.

The present invention has been made to solve the above problem, and an object of the present invention is to obtain a synchronous reluctance motor that can achieve both of high output torque and reduced torque ripple.

Solution to the Problems

A synchronous reluctance motor according to the present invention includes: an annular stator core having S slots arranged at equal intervals along an inner circumferential surface thereof; a winding stored in each of the slots; and a cylindrical rotor core provided on an inner surface side of the stator core and having P magnetic poles, the rotor core having, for each magnetic pole, a plurality of slits formed by arc-shaped openings which are convex toward a cylinder center and whose apexes are positioned on a q axis, as seen in a center axis direction of the cylinder.

A number of the plurality of slits provided in one pole of the rotor core is denoted by $b_{max}$. Of the plurality of slits, the slit closest to the outer circumferential surface of the rotor core is defined as a first slit. With b and n defined as integers not less than 1, at a bth slit from the outer circumferential surface of the rotor core toward the cylinder center, an inner edge close to the cylinder center, of the opening forming the bth slit is defined as a (n=2b)th arc, and an outer edge opposed to the inner edge, of the opening forming the bth slit is defined as a (n=2b−1)th arc. An arc of an inner edge of a $b_{max}$th slit closest to the cylinder center is defined as an $n_{max}$th arc. The nth arc has an arc center point on the q axis at a distance D(n) from the outer circumferential surface of the rotor core. A radius of the nth arc with respect to the arc center point is denoted by R(n).

A ratio k(n) between the distance D(n) and the radius R(n) is defined as k(n)= D(n)/R(n).

The ratios k(1) to k(n) respectively corresponding to the first to nth arcs are determined such that a ratio $k(n_{max})$ for the $n_{max}$th arc is in a range of $0.20 \leq k(n_{max}) \leq 0.37$, the ratio k(n) for the nth arc satisfies a relationship of $k(n_{max}) < \ldots < k(n) < \ldots < k(1) < 1$, and in a graph with the integer n set on a horizontal axis and the ratio k(n) set on a vertical axis, a slope a when plotted points of values of the ratios k(1) to $k(n_{max})$ are linearly approximated is in a range of $(-0.92/n_{max}) \leq a \leq (-0.71/n_{max})$.

Effect of the Invention

In the synchronous reluctance motor according to the present invention, the slits can be provided with an optimum interval, whereby increase in torque ripple due to the interval of the slots of the stator can be suppressed and high output torque can be produced.

BRIEF DESCRIPTION OF THE DRAWINGS

FIG. 22 shows an example of a relationship of angular dimensions in FIG. 17 to FIG. 21, in the synchronous reluctance motor having six poles and thirty-six slots according to embodiment 2 for carrying out the present invention.

DESCRIPTION OF EMBODIMENTS

Figure 1:
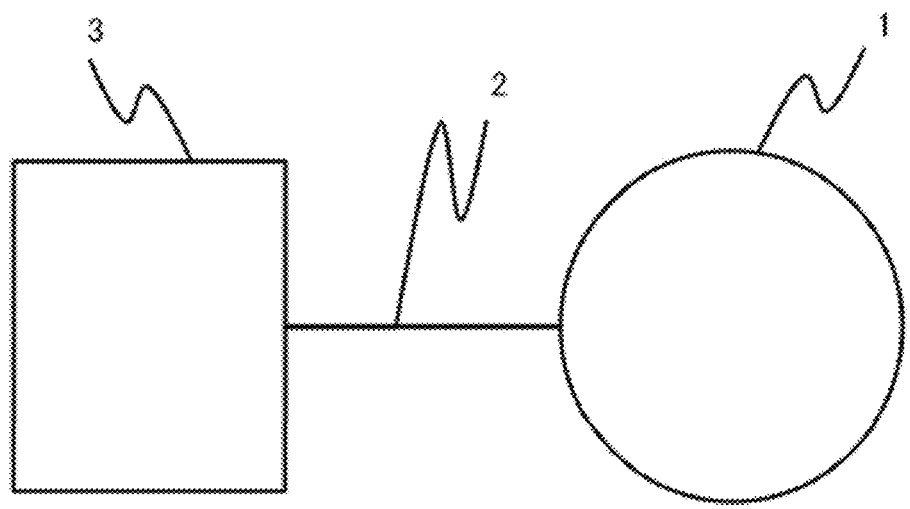
FIG. 1 is a configuration diagram showing a system using a synchronous reluctance motor according to embodiment 1 for carrying out the present invention.

Hereinafter, preferred embodiments of a synchronous reluctance motor according to the present invention will be described with reference to the drawings. In the drawings, the same or corresponding parts are denoted by the same reference characters, to give description.

Embodiment 1

FIG. 1 is a configuration diagram showing a system using a synchronous reluctance motor 1 according to embodiment 1 for carrying out the present invention. In FIG. 1, the synchronous reluctance motor 1 is connected to a control device 3 via a power supply line 2, and is an electric machine for converting electric energy supplied from the control device 3 to mechanical energy.

Figure 2:
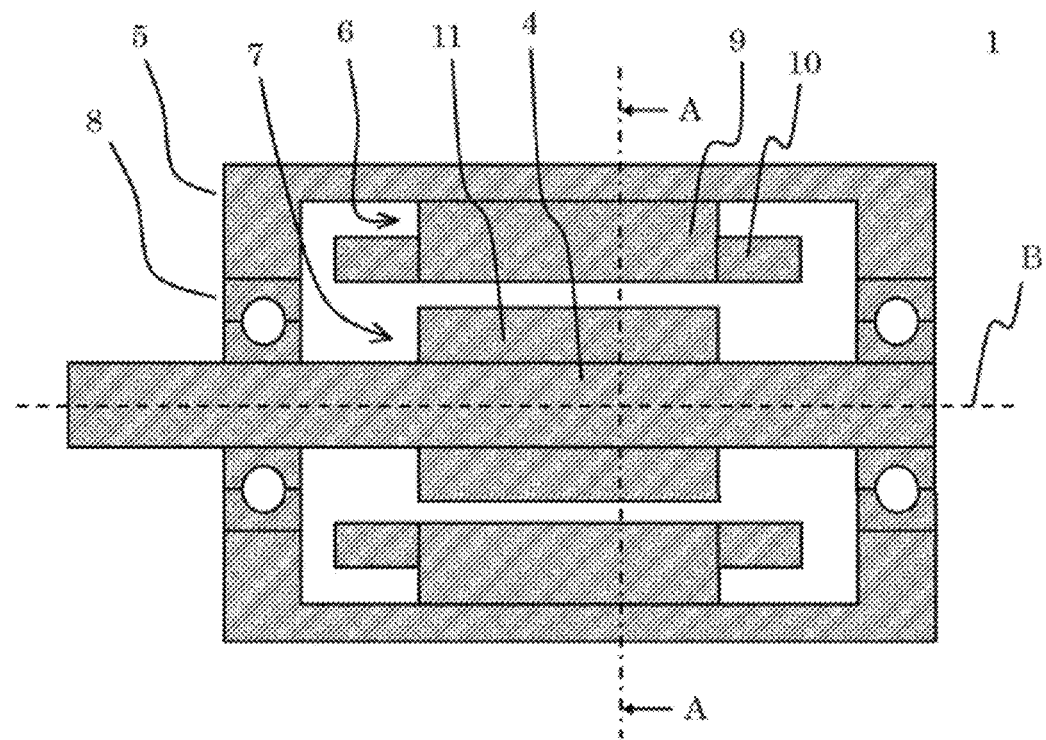
FIG. 2 is a sectional view of the synchronous reluctance motor according to embodiment 1 for carrying out the present invention, along an axial direction.

FIG. 2 is a sectional view of the synchronous reluctance motor 1 according to embodiment 1 along the axial direction of a shaft 4. A broken line B shown in FIG. 2 indicates the axis of the shaft 4. In FIG. 2, an annular stator 6 fixed by being inserted into a frame 5 by means of press-fit, shrink-fit, or the like, and a cylindrical rotor 7 are arranged rotatably relative to each other with a mechanical gap (magnetic gap) therebetween, using bearings 8.

The stator 6 is formed by providing a winding 10 to an annular stator core 9 made of an iron core. When electric energy supplied from the control device 3 is provided to the winding 10, a rotating magnetic field is generated in the magnetic gap. The rotor 7 is formed such that the shaft 4 is inserted into the center of a cylindrical rotor core 11 which is made of an iron core and of which the number of magnetic poles is P, by means of press-fit, shrink-fit, or the like, so as to be integrated.

Figure 3:
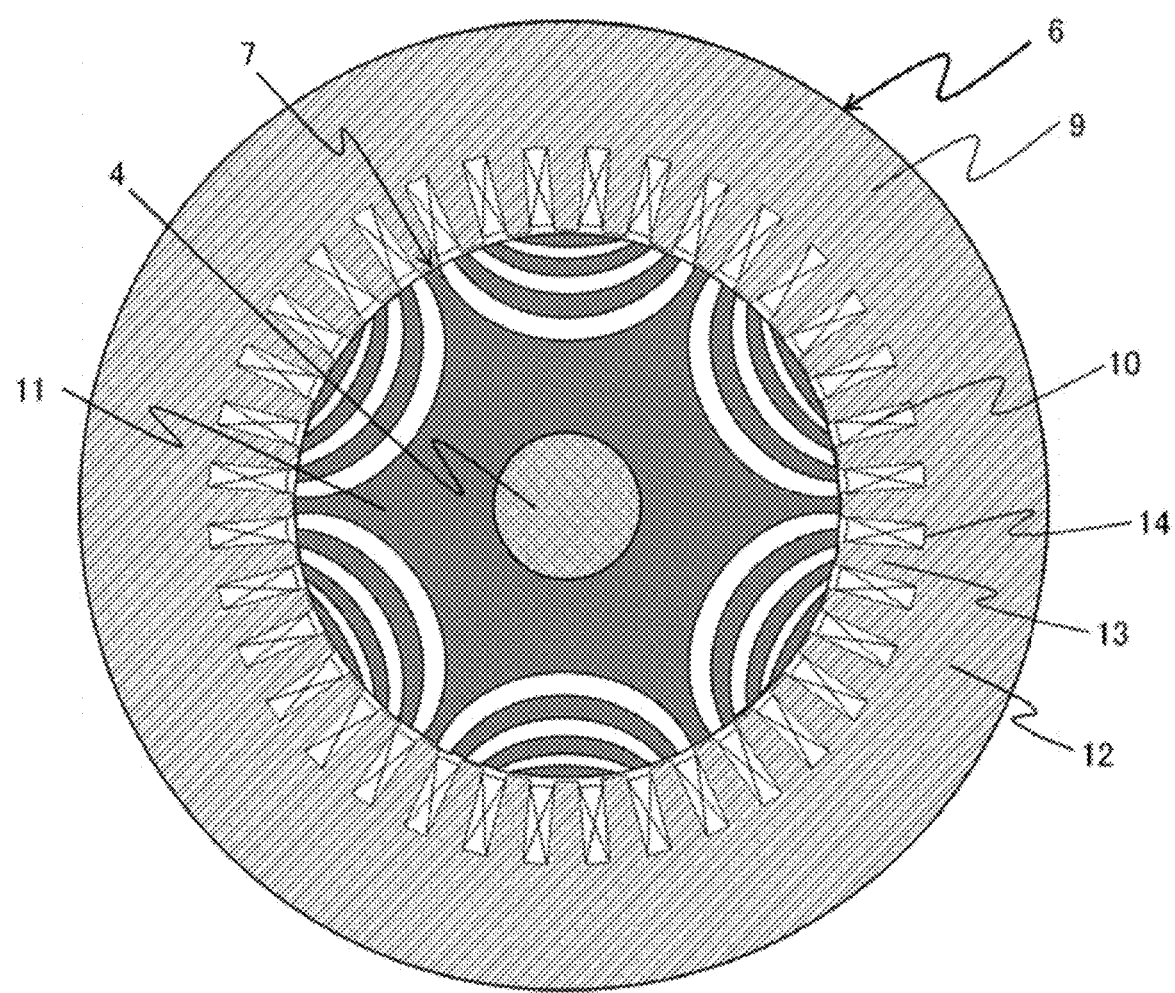
FIG. 3 is a sectional view of a synchronous reluctance motor having six poles and thirty-six slots according to embodiment 1 for carrying out the present invention, along line A-A in FIG. 2.

FIG. 3 is a sectional view of the three-phase synchronous reluctance motor 1 having six poles and thirty-six slots according to embodiment 1, along line A-A in FIG. 2. The stator core 9 has an annular core back 12 and teeth 13 protruding radially inward from the core back 12 and arranged at equal intervals. Slots 14 are formed at equal intervals between the teeth 13 provided on the radially inner side of the stator core 9, and the winding 10 is stored in the slots 14. In the synchronous reluctance motor 1 according to embodiment 1, the teeth 13 and the slots 14 are provided at the same angles.

The number of slots in the synchronous reluctance motor 1 is denoted by S, and the number of magnetic poles of the rotor core 11 is denoted by P. In FIG. 3, the synchronous reluctance motor 1 having six poles and thirty-six slots is described, but this configuration is merely an example and the number S of slots and the number P of magnetic poles are not limited thereto.

Figure 4:
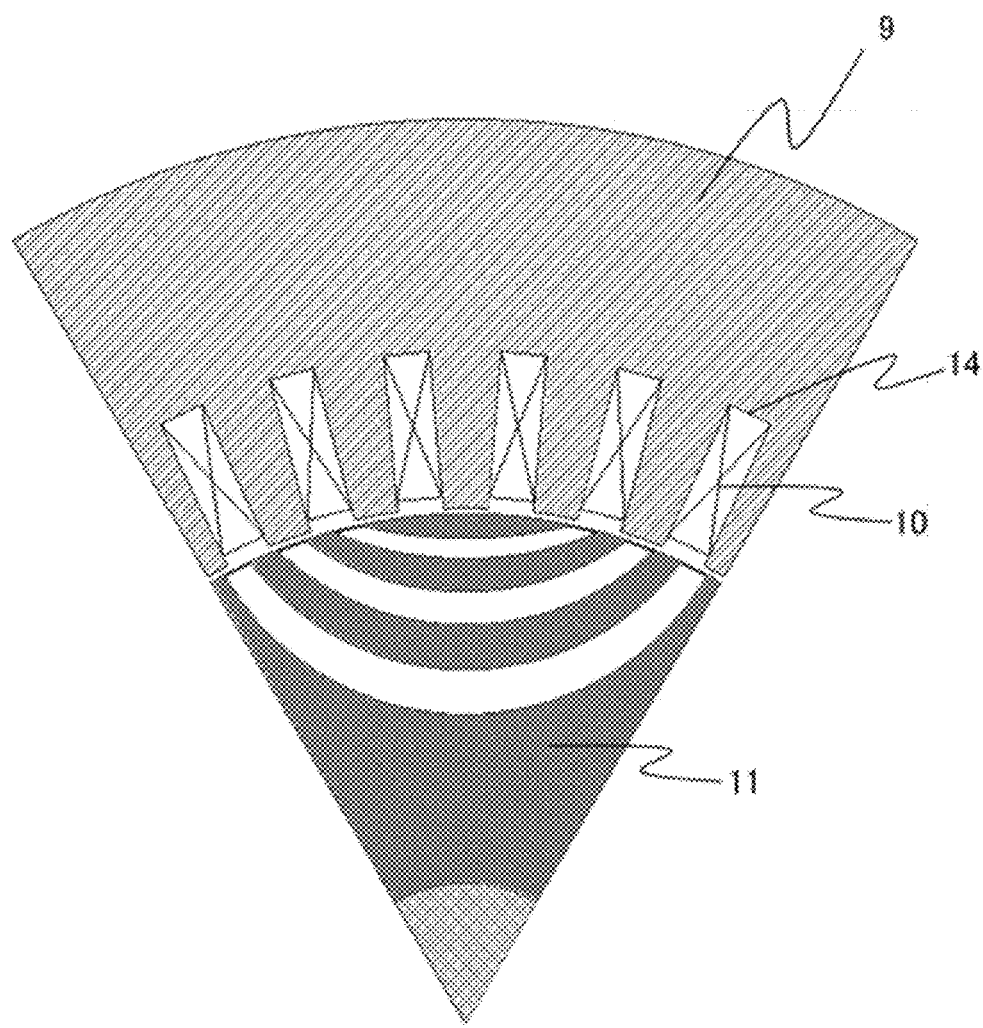
FIG. 4 is a sectional view showing a part for one magnetic pole of the synchronous reluctance motor having six poles and thirty-six slots according to embodiment 1 for carrying out the present invention.

FIG. 4 is a sectional view showing a part for one magnetic pole of the synchronous reluctance motor 1 having six poles and thirty-six slots according to embodiment 1. This is a model obtained by taking out an area of 1/6 in FIG. 3, and in the stator 6 of the synchronous reluctance motor 1 having six poles and thirty-six slots, there are six slots 14 per magnetic pole.

Figure 5:
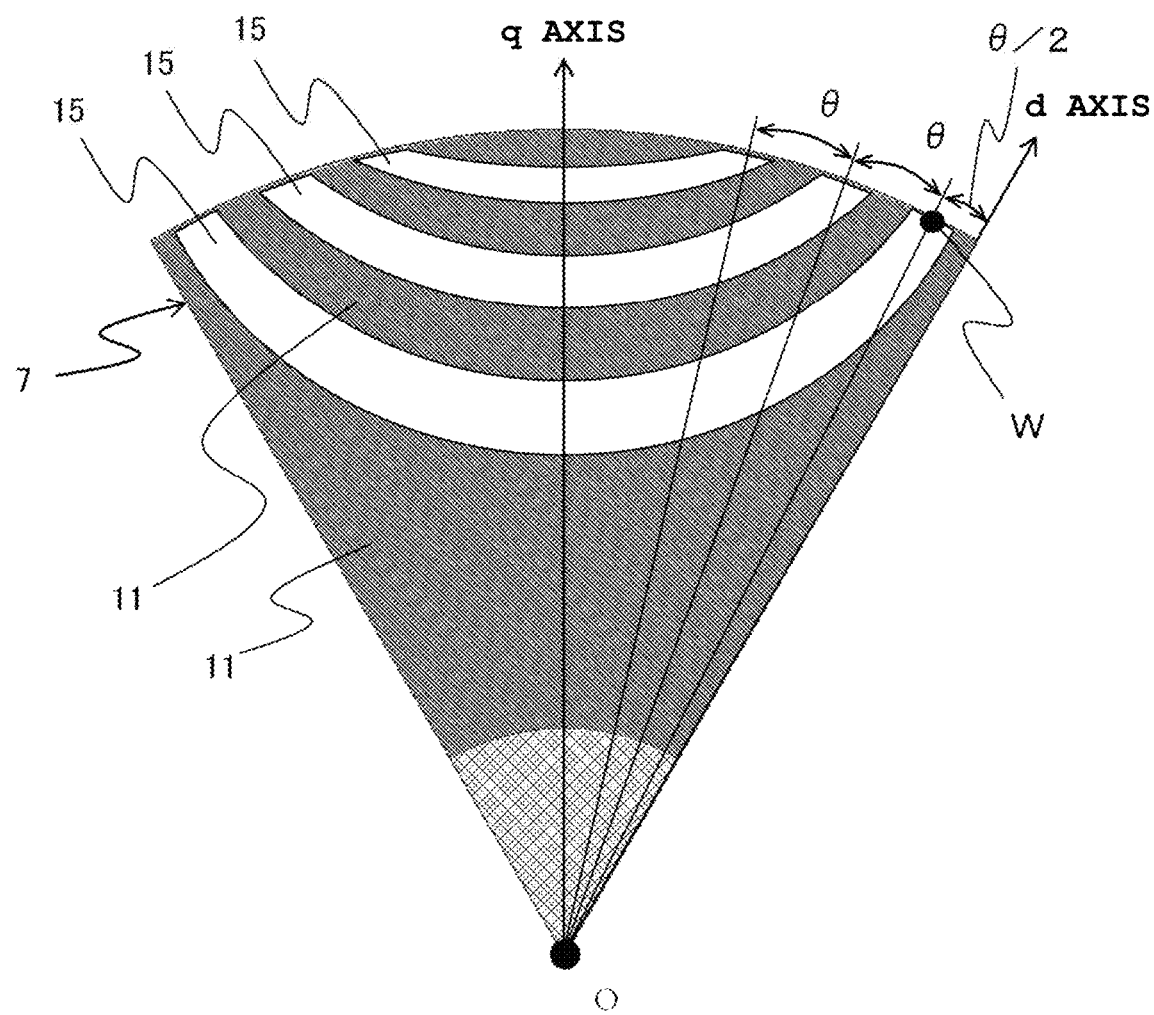
FIG. 5 is a sectional view showing a rotor of the synchronous reluctance motor having six poles and thirty-six slots according to embodiment 1 for carrying out the present invention.

FIG. 5 is a sectional view showing the rotor 7 of the synchronous reluctance motor 1 having six poles and thirty-six slots according to embodiment 1. In the cross-section of the rotor core 11, a d axis is defined in a direction (center line direction of magnetic pole) in which a magnetic flux readily passes, and a q axis is defined in a direction (center line direction between magnetic poles) in which a magnetic flux hardly passes. It is noted that there is a phase difference of 90 degrees electrically between the d axis and the q axis. The rotor 7 rotates by inductance torque generated on the basis of an inductance difference between the salient direction (d axis) and the non-salient direction (q axis). Thus, the synchronous reluctance motor 1 generates output torque by using difference in the magnetic resistance along the rotational direction. Therefore, the greater the inductance difference between the d axis and the q axis is, the higher the produced output torque is.

In FIG. 5, as seen in the center axis direction of the cylinder, the rotor core 11 has, for each magnetic pole of the rotor core 11, a plurality of slits 15 formed by arc-shaped openings which are convex toward the cylinder center (center O) of the rotor core 11 and whose apexes are positioned on the q axis, and the rotor core 11 made of a magnetic material (e.g., electromagnetic steel sheet) and each slit 15 made of a nonmagnetic material (e.g., air) are arranged alternately in the radial direction. Here, the number of the slits 15 is not limited to three, and may be another number. In addition, ends of each slit 15 may be chamfered in an arc shape. The term "arc" includes also a shape similar to an arc shape, approximately formed by straight lines or the like, for example. It is noted that the slits 15 are provided symmetrically with respect to the q axis in each magnetic pole.

An arrangement method for the slits 15 will be described below. As shown in FIG. 5, one d axis is arbitrarily specified in the rotor core 11, and a circumferential-direction midpoint of an end (part), i.e., an arc, along the outer circumferential surface of the rotor core 11, of the arc-shaped opening of the slit 15 closest to the d axis passing the center O of the rotor core 11, is defined as a center point W. An angle θ formed by the center points W of the adjacent ones of the slits 15 provided in one magnetic pole with respect to the center O of the rotor core 11 is set to be equal among the respective adjacent slits. In addition, an angle formed by the d axis and a line connecting the center point W of the slit closest to the d axis and the center O of the rotor core 11, is set to θ/2. Hereinafter, the angle θ between the adjacent slits is referred to as an interval θ of the slits.

A preferable range of the interval θ of the slits will be described below. In the synchronous reluctance motor 1, torque ripple occurs due to a relative relationship between permeances of the stator 6 and the rotor 7. Therefore, when the timings of change in the permeance of the stator 6 and change in the permeance of the rotor 7 coincide with each other, pulsation of output torque increases, so that the torque ripple becomes significant. In the torque ripple, components due to the interval of the slots 14 of the stator 6 are great and mainly include a harmonic component due to the number S of the slots of the stator 6 and a harmonic component corresponding to two times the number S of the slots of the stator 6.

In order to reduce torque ripple, it is necessary that change in the permeance of the stator 6 and change in the permeance of the rotor 7 do not coincide with each other.

Therefore, the interval θ of the slits 15 needs to be determined so as not to be equal to the interval of the slots 14 of the stator 6 and ½ of the interval of the slots 14 of the stator 6. That is, it is necessary to satisfy θ≠360°/S and θ≠360°/2S.

In addition, where z is the number of phases, P is the number of poles, and Q is the number of slots per pole per phase, if the slits 15 are provided with a greater interval (360°/S<θ, S=P×z×Q) than the interval of the slots 14 of the stator 6, the inductance on the q axis increases, and thus there is a possibility that the output torque cannot be sufficiently produced. If the slits 15 are provided with a smaller interval (θ<360°/2S) than ½ of the interval of the slots 14 of the stator 6, the interval of the slits 15 is narrowed and thus it becomes difficult to stamp the rotor core 11, leading to increase in the manufacturing cost.

That is, in consideration of torque and ease of manufacturing of the motor, it is desirable to satisfy $360/(2 \times P \times z \times Q) < \theta < 360/(P \times z \times Q)$.

This can be arranged into $360/(2 \times P \times z) < \theta \times Q < 360/(P \times z)$.

Figure 6:
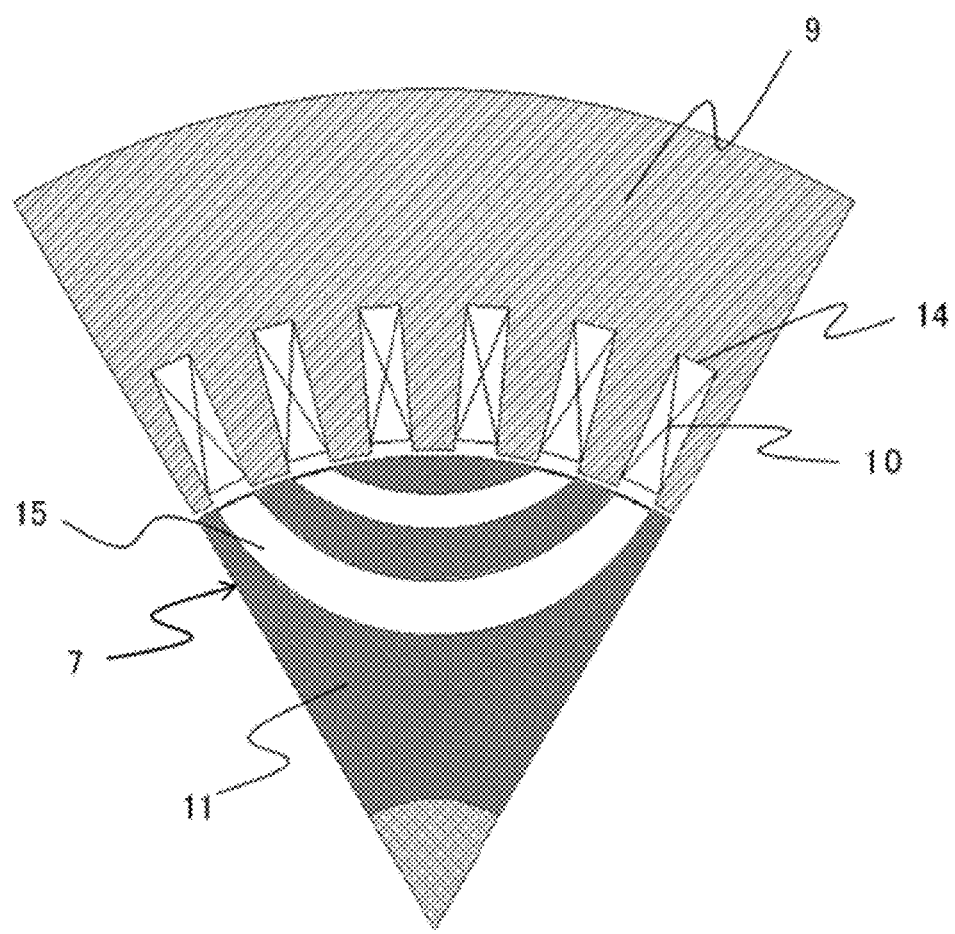
FIG. 6 is a sectional view showing a rotor in which the number of slits is two, in the synchronous reluctance motor having six poles and thirty-six slots according to embodiment 1 for carrying out the present invention.
Figure 7:
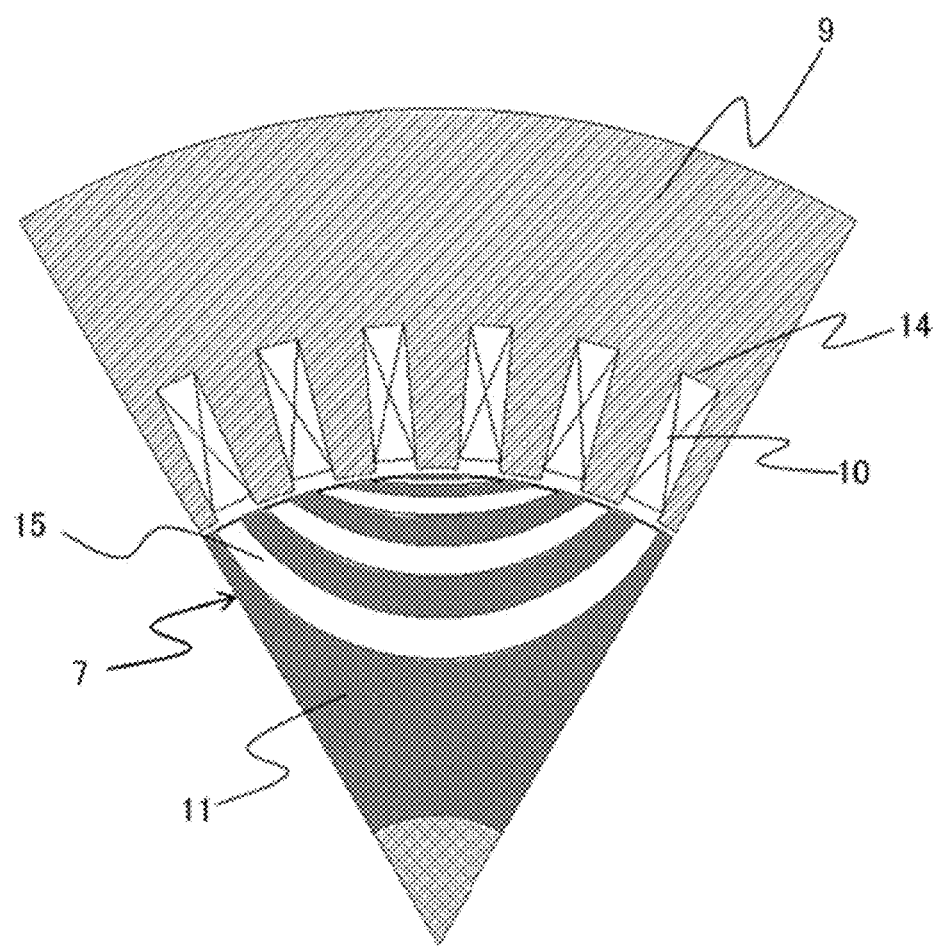
FIG. 7 is a sectional view showing a rotor in which the number of slits is four, in the synchronous reluctance motor having six poles and thirty-six slots according to embodiment 1 for carrying out the present invention.

FIG. 6 and FIG. 7 are sectional views showing a part for one magnetic pole of the synchronous reluctance motor 1 having six poles and thirty-six slots according to embodiment 1, in cases where the number of the slits 15 is two and four, respectively. The case of four slits 15 is referred to as a model 101, the case of three slits 15 is referred to as a model 102, and the case of two slits 15 is referred to as a model 103.

Figure 8:
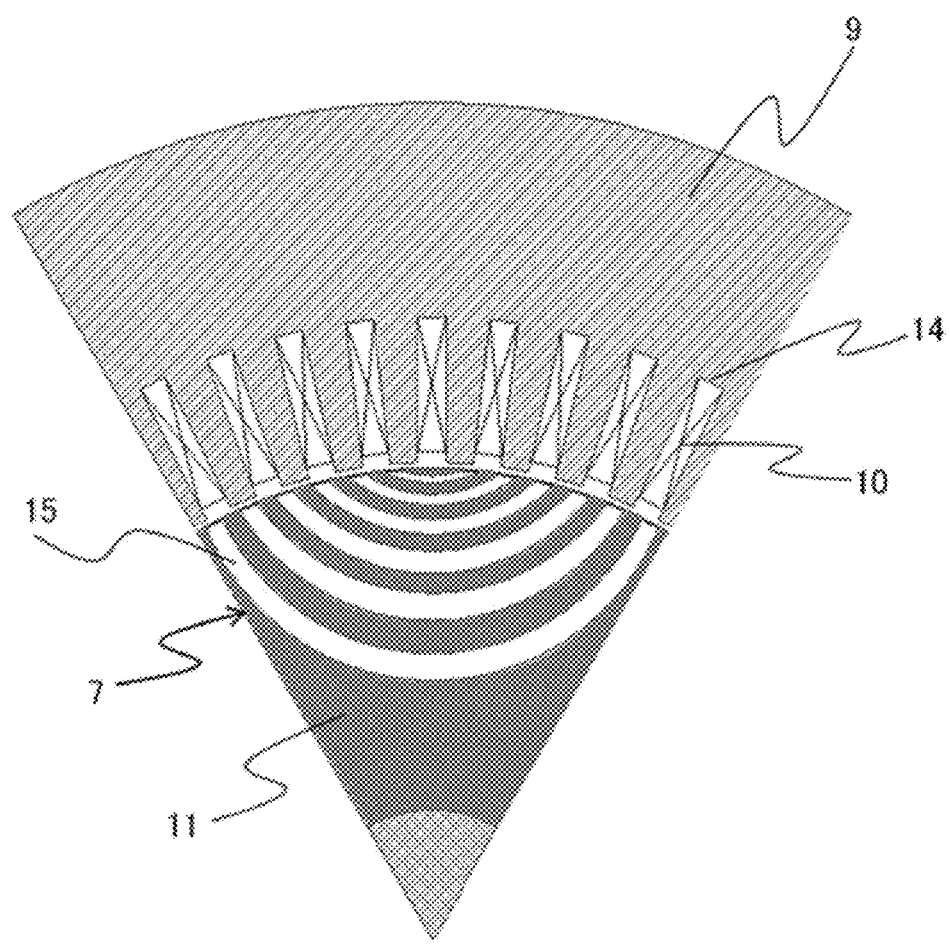
FIG. 8 is a sectional view showing a rotor in which the number of slits is six, in a synchronous reluctance motor having six poles and fifty-four slots according to embodiment 1 for carrying out the present invention.
Figure 9:
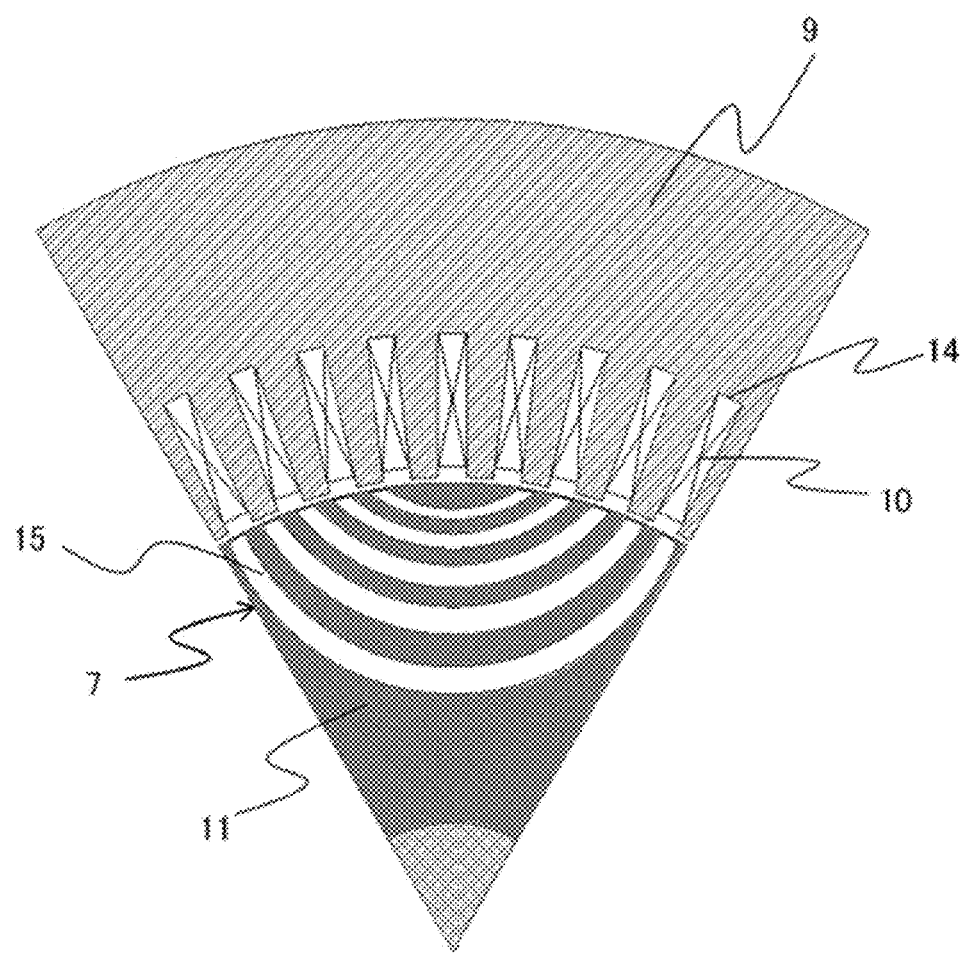
FIG. 9 is a sectional view showing a rotor in which the number of slits is five, in the synchronous reluctance motor having six poles and fifty-four slots according to embodiment 1 for carrying out the present invention.
Figure 10:
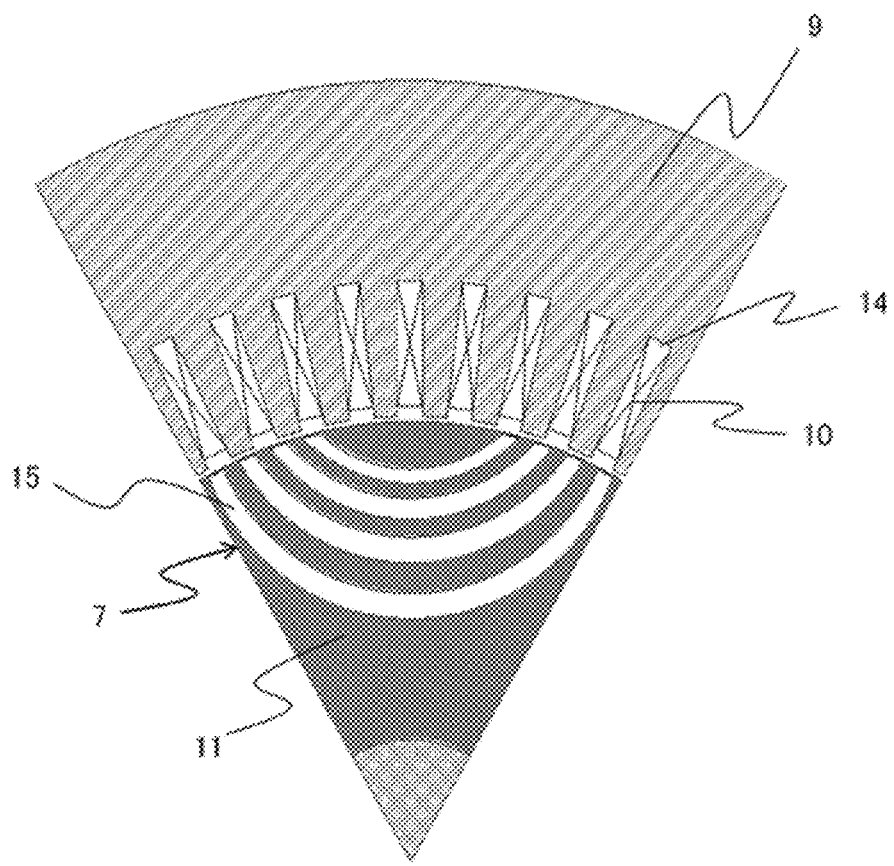
FIG. 10 is a sectional view showing a rotor in which the number of slits is four, in the synchronous reluctance motor having six poles and fifty-four slots according to embodiment 1 for carrying out the present invention.

FIG. 8 to FIG. 10 are sectional views showing a part for one magnetic pole of the synchronous reluctance motor 1 having six poles and fifty-four slots according to embodiment 1, in cases where the number of the slits 15 is six, five, and four, respectively. The case of six slits 15 is referred to as a model 104, the case of five slits 15 is five is referred to as a model 105, and the case of four slits 15 is referred to as a model 106.

A relationship between the interval θ of the slits 15 and output torque and a relationship between the interval θ of the slits 15 and torque ripple will be discussed using electromagnetic field analysis by a finite element method. In the discussion, the synchronous reluctance motors 1 of six shapes shown in FIG. 5 to FIG. 10 were used.

Figure 11:
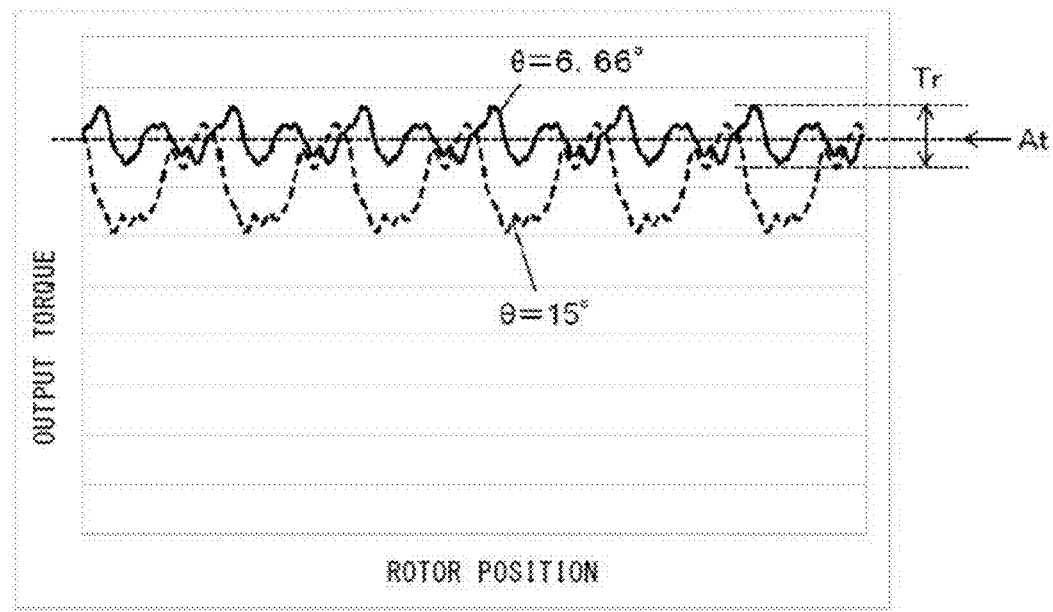
FIG. 11 illustrates an output torque waveform with respect to a rotor position in the synchronous reluctance motor having six poles and thirty-six slots according to embodiment 1 for carrying out the present invention.

FIG. 11 illustrates an output torque waveform with respect to the position of the rotor 7, in the synchronous reluctance motor 1 having six poles and thirty-six slots according to embodiment 1. In two models in a case where the number of the slits was four and the value of the interval θ of the slits 15 was 6.66° and in a case where the number of the slits was two and the value of the interval θ of the slits 15 was 15°, the winding 10 of the stator 6 was energized, and electromagnetic field analysis was performed to calculate output torque waveforms, which are shown for one cycle of electric angle. It is noted that θ=6.66° corresponds to 360°/(1.5S) and is a value between θ=10° (360°/S) which is the interval of the slots 14 of the stator 6 and θ=5° (360°/2S) which is ½ of the interval of the slots 14 of the stator 6. In addition, θ=15° (=360°/24) is a value calculated on the basis of the determination method for the interval θ of the slits 15 described in Patent Document 1. It is noted that, as described above, the number S of the slots is represented as S=P×z×Q.

According to the analysis result shown in FIG. 11, it is found that, in the case where the value of the interval θ of the slit 15 was 6.66°, high output torque and reduced torque ripple were achieved as compared to the case where the value of the interval θ of the slits 15 was 15°.

Subsequently, also for another case of the interval θ of the slits 15, the influence on output torque and torque ripple was confirmed. For comparison, values of average torque and a torque ripple rate are calculated. The average torque is indicated by At in FIG. 11, and is an average value of output torque for one cycle of electric angle. Both amplitudes of torque ripple are indicated by Tr in FIG. 11, and a torque ripple rate C is a value obtained by dividing, by the average torque, a one-side amplitude which is the half of both amplitudes of torque ripple representing the change amount of the output torque waveform. That is, the torque ripple rate C is represented as $C = Tr/(2 \times At) \times 100(\%)$.

Figure 12:
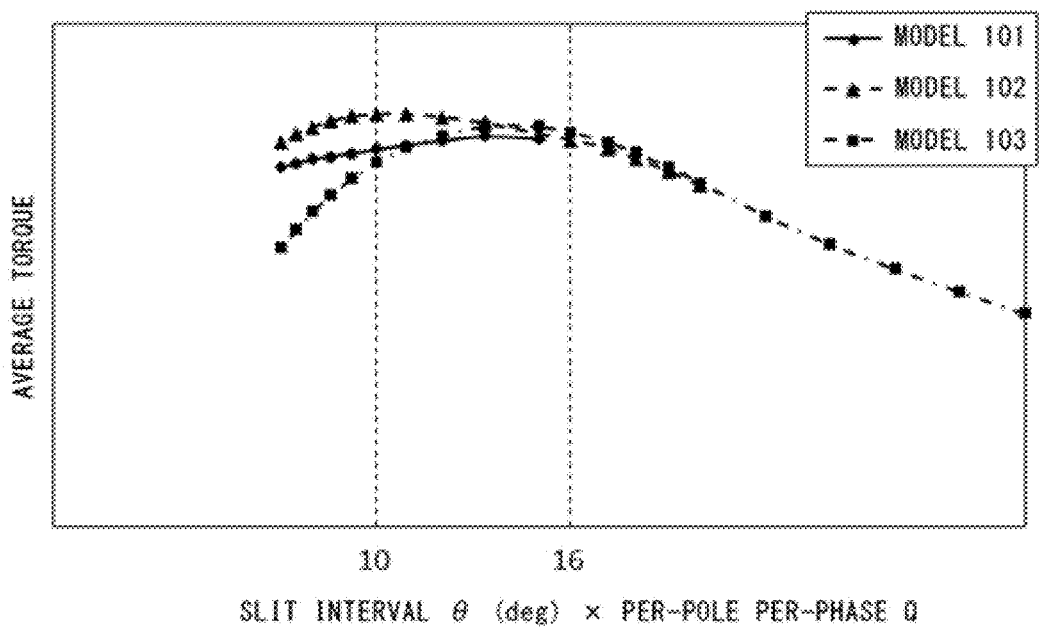
FIG. 12 illustrates a relationship of output torque with respect to an interval θ of slits 15 in the synchronous reluctance motor having six poles and thirty-six slots according to embodiment 1 for carrying out the present invention.

FIG. 12 illustrates a relationship of output torque with respect to the interval θ of the slits 15×per-pole per-phase Q, in the synchronous reluctance motor 1 having six poles and thirty-six slots according to embodiment 1. Here, the per-pole per-phase represents the number of slots per one pole per one phase. In FIG. 12, six poles and thirty-six slots are provided and there are three phases, and thus Q is represented as 36 (number of slots: S)÷6 (number of poles: P)÷3 (number of phases)=2. In FIG. 12, a case where the value on the horizontal axis is 10 corresponds to ½ of the interval of the slots 14 of the stator 6. In FIG. 12, an analysis result in the case of four slits 15 is indicated by a solid line (model 101), an analysis result in the case of three slits 15 is indicated by a dotted line (model 102), and an analysis result in the case of two slits 15 is indicated by a dotted-dashed line (model 103).

Figure 13:
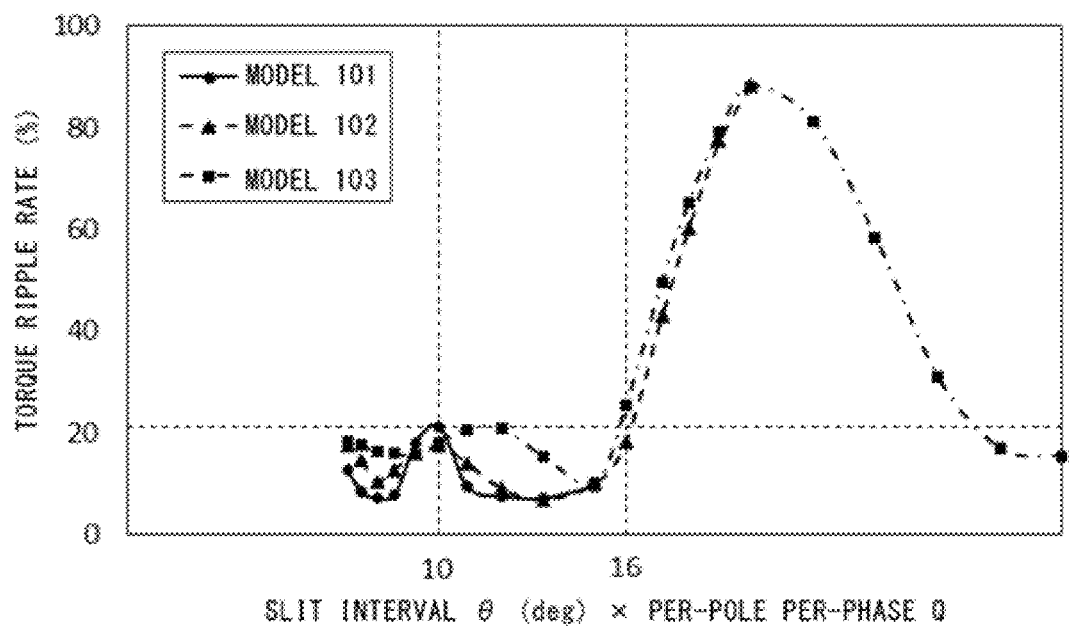
FIG. 13 illustrates a relationship of torque ripple with respect to the interval θ of the slits 15 in the synchronous reluctance motor having six poles and thirty-six slots according to embodiment 1 for carrying out the present invention.

FIG. 13 illustrates a relationship of the torque ripple rate with respect to the interval θ of the slits 15×per-pole per-phase Q, in the synchronous reluctance motor 1 having six poles and thirty-six slots according to embodiment 1. As in FIG. 12, an analysis result in the case of four slits 15 is indicated by a solid line (model 101), an analysis result in the case of three slits 15 is indicated by a dotted line (model 102), and an analysis result in the case of two slits 15 is indicated by a dotted-dashed line (model 103).

In a range where the interval θ of the slits 15×per-pole per-phase Q is smaller than 10, the torque ripple rate is small as shown in FIG. 13, but the average torque is reduced as shown in FIG. 12. This is because the sectional areas of the slits 15 are increased and thus the magnetic flux passing through the rotor core 11 decreases and the inductance on the d axis decreases. Further, since the interval of the slits 15 is narrowed, it becomes difficult to stamp the rotor core 11, leading to increase in the manufacturing cost.

From FIG. 12 and FIG. 13, it has been found out that, when the interval θ of the slits 15 is in a range of 10<θ×Q<16 indicated by broken lines in FIG. 12 and FIG. 13, the maximum average torque can be generated and reduced torque ripple can be achieved, in any of the models. Thus, it has been found out that, in any of the models, the range where the maximum average torque can be generated and reduced torque ripple can be achieved is a range shown by the following Expression (1).

$$360°/(2 \times P \times z) < \theta \times Q < 360°/(1.25 \times P \times z) \quad (1)$$

Here, z is the number of phases, and in the present embodiment, z is 3. Therefore, the left-hand side in Expression (1) becomes 360°/(2×6×3)=10, and the right-hand side becomes 16 through similar calculation.

Therefore, if the slits 15 are provided with the interval θ in the range shown by Expression (1), change in the permeance of the stator 6 and change in the permeance of the rotor 7 do not coincide with each other, and further, the difference between the inductances on the d axis and the q axis is increased by the provided slits 15, whereby increase in torque ripple due to the interval of the slots 14 of the stator 6 can be suppressed and high output torque can be generated.

That is, by providing the slits 15 with the interval θ in the range shown by Expression (1), it becomes possible to achieve reduced torque ripple and high output torque in a configuration having a wider interval θ for the slits 15.

Figure 14:
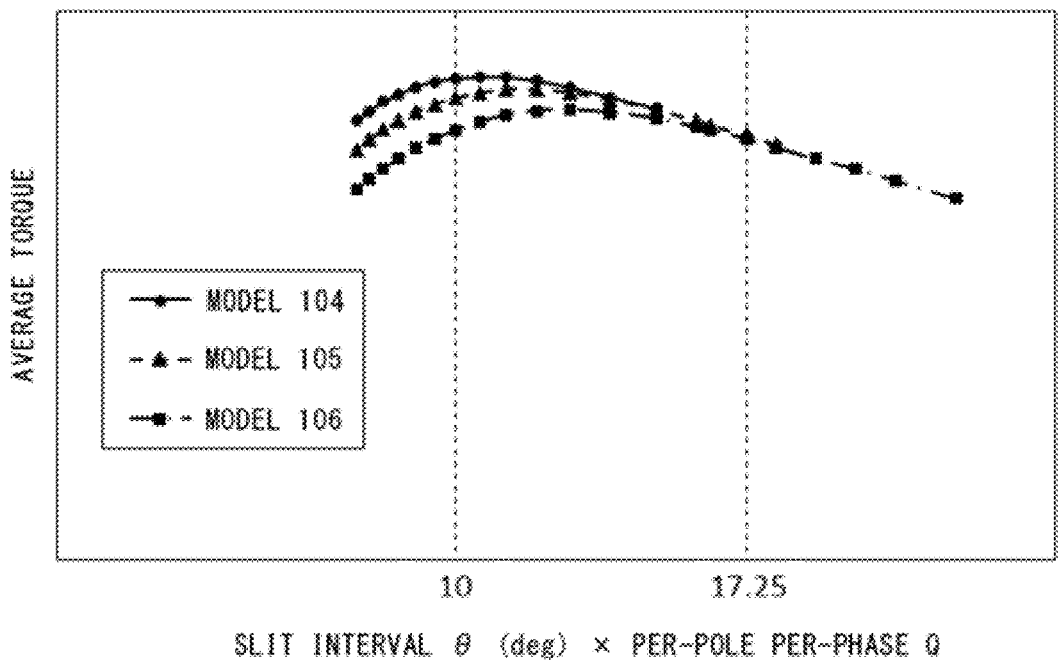
FIG. 14 illustrates a relationship of output torque with respect to the interval θ of the slits 15 in the synchronous reluctance motor having six poles and fifty-four slots according to embodiment 1 for carrying out the present invention.
Figure 15:
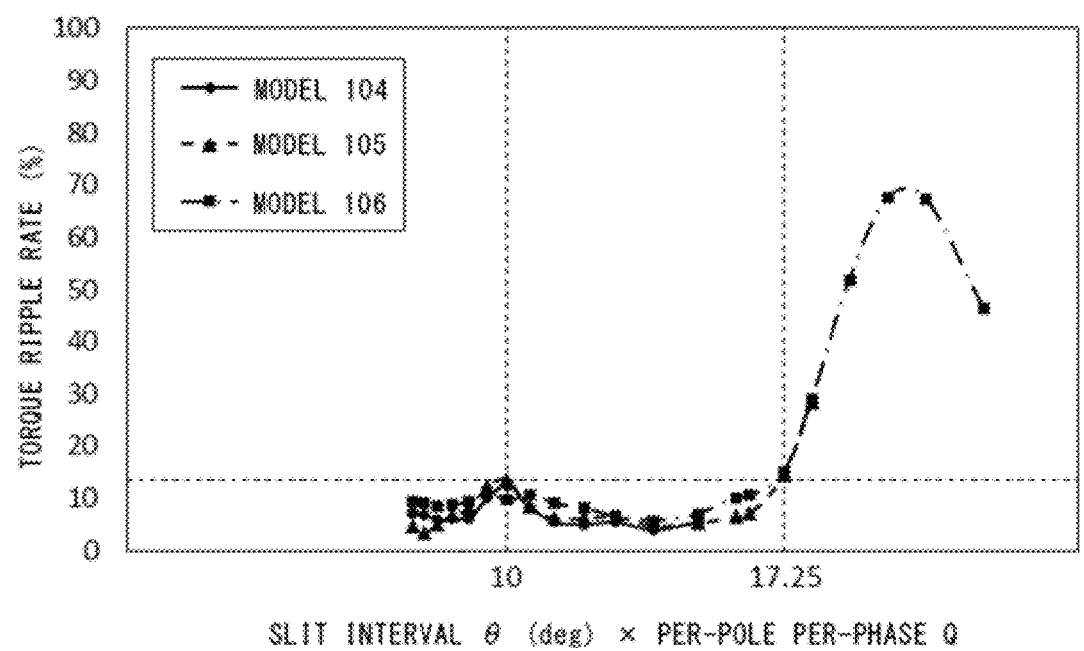
FIG. 15 illustrates a relationship of torque ripple with respect to the interval θ of the slits 15 in the synchronous reluctance motor having six poles and fifty-four slots according to embodiment 1 for carrying out the present invention.

FIG. 14 illustrates a relationship of output torque with respect to the interval θ of the slits 15, in the three-phase synchronous reluctance motor 1 having six poles and fifty-four slots according to embodiment 1, and FIG. 15 illustrates a relationship of torque ripple with respect to the interval θ of the slits 15×per-pole per-phase Q, in the synchronous reluctance motor 1 having six poles and fifty-four slots according to embodiment 1. In FIG. 14, the per-pole per-phase Q is 54 (number of slots: S)÷6 (number of poles: P)÷3 (number of phases)=3.

Also in FIG. 14 and FIG. 15, as in FIG. 12 and FIG. 13, the case where the interval of the slits 15×per-pole per-phase Q indicated on the horizontal axis is 10 corresponds to ½ of the interval of the slots 14 of the stator 6.

In FIG. 14 and FIG. 15, it has been found out that, if the interval θ of the slits 15 is in a range of 10°<θ×Q<17.25°, the maximum average torque can be generated and reduced torque ripple can be achieved, in any of the models. A general expression of this range is represented by the following Expression (2).

$$360°/(2\times P\times z)<\theta\times Q<360°/(1.16\times P\times z) \quad (2)$$

Here, the range of Expression (2) is wider than the range of Expression (1), but as in the analysis result for the synchronous reluctance motor 1 having six poles and thirty-six slots shown in FIG. 12 and FIG. 13, by providing the slits 15 with the interval θ in the range shown by Expression (1), it is possible to achieve reduced torque ripple and high output torque irrespective of the per-pole per-phase Q. In particular, in the case where the per-pole per-phase Q is 3, reduced torque ripple and high output torque can be achieved using the range shown by Expression (2).

As described above, irrespective of the number of the slits 15 and combination of the number P of magnetic poles and the number S of slots, it is possible to avoid a state in which change in the permeance of the stator 6 and change in the permeance of the rotor 7 coincide with each other, by providing the slits 15 with the interval θ in the range shown by Expression (1). Thus, increase in torque ripple due to the interval of the slots 14 of the stator 6 can be suppressed, and since the difference between the inductances on the d axis and the q axis is increased by the provided slits 15, high output torque can be produced even in a configuration having a wider interval θ of the slits 15.

In the synchronous reluctance motor 1 according to embodiment 1, the slits 15 can be provided with an optimum interval, whereby increase in torque ripple due to the interval of the slots 14 of the stator 6 can be suppressed and high output torque can be produced.

Embodiment 2

In embodiment 2 for carrying out the present invention, preferred arc shapes forming the slits 15 for achieving high output torque and reduced torque ripple will be described.

Figure 16:
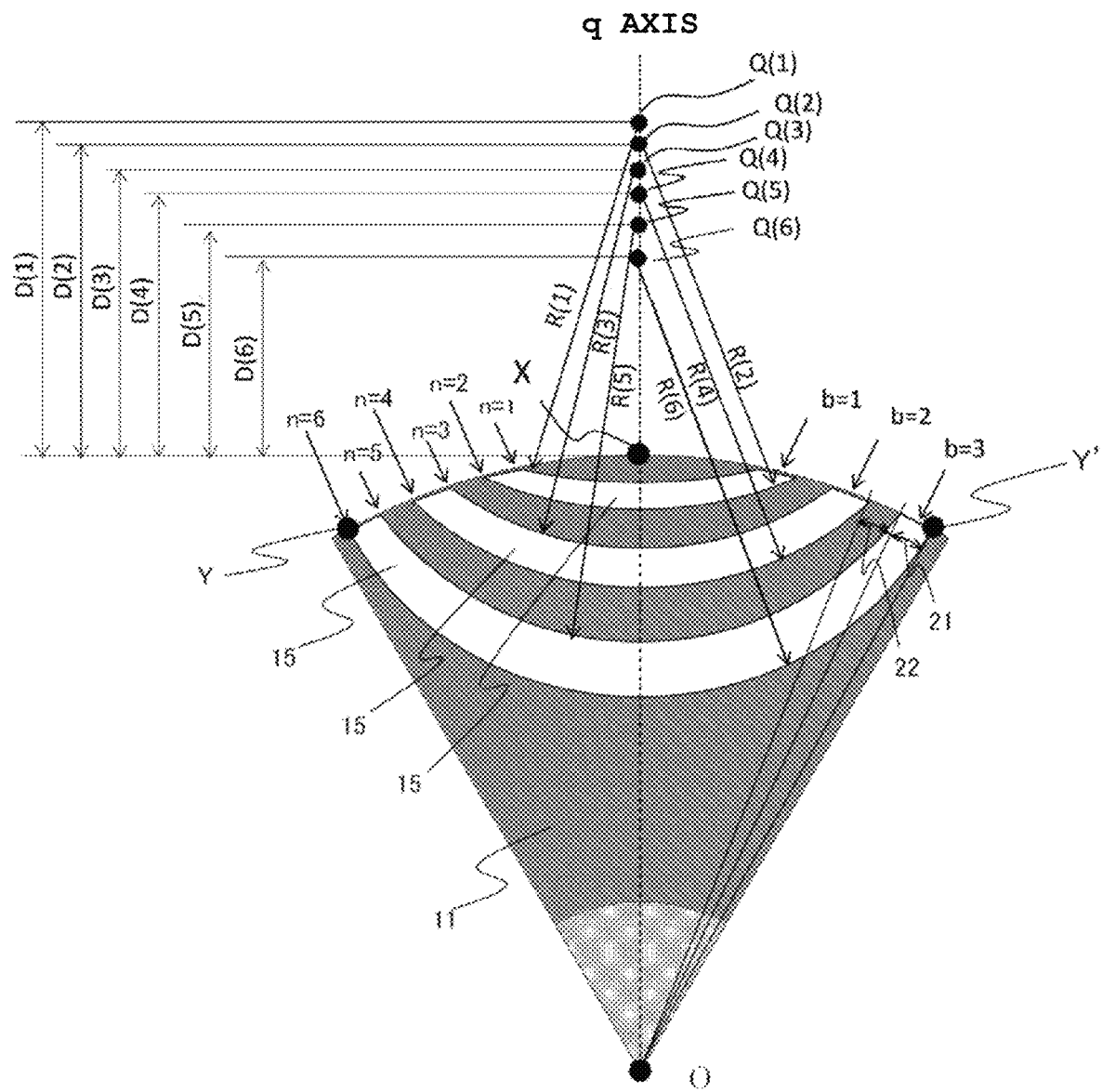
FIG. 16 illustrates the definition of arc dimensions in a rotor of a synchronous reluctance motor having six poles and thirty-six slots according to embodiment 2 for carrying out the present invention.

FIG. 16 shows a sectional view of the rotor 7 of the synchronous reluctance motor 1 having six poles and thirty-six slots according to embodiment 2, and illustrates the definition of the arc dimensions. In embodiment 1, a slit configuration is set such that a slit width 21 which is the opening width in the short-side direction of each slit 15 and a core width 22 which is the width of a part of the rotor core 11 between the slits 15 are uniform, and the effects based on the arrangement interval θ of the slits 15 have been described. In embodiment 2, the influence of the arc shape, i.e., the convex shape of the slit 15 and the slit width 21 thereof, on output torque and torque ripple will be described.

In order to obtain the effects of high output torque and reduced torque ripple, it is necessary to make the slit widths 21 entirely or partially narrower than the core widths 22 so as to form a structure in which a magnetic flux generated by a magnetomotive force of the stator 6 readily passes.

Hereinafter, using an electromagnetic field analysis result by a finite element method, the influence of the convex shape of the slit 15 and the slit width 21 thereof on output torque and torque ripple will be described.

Dimensions needed for forming the arc shape of the slit 15 will be defined.

In FIG. 16, b indicates numbers of the slits 15 provided in each magnetic pole. Regarding the slits 15 provided in each magnetic pole shown in FIG. 16, in a case where, of the plurality of slits 15, the slit 15 closest to the outer circumferential surface of the rotor core 11 is defined as a first slit, the remaining slits are defined as second, third, . . . , bth slits in order from the one closest to the first slit. That is, b is an integer not less than 1.

In FIG. 16, n indicates numbers of arcs of outer edges (edges far from center O) and inner edges (edges close to center O) of the slits 15 provided in each magnetic pole. For example, the outer edge of the bth slit 15 is defined as a (n=2b−1)th arc and the inner edge is defined as a (n=2b)th arc. For the arcs shown in FIG. 16, n can take values of 1 to 6 because the number of the slits is 3. That is, n is an integer not less than 1.

The interval θ between the adjacent slits 15 in each magnetic pole is determined depending on the applied motor, within the range shown by Expression (1) or Expression (2). While the interval θ of the slits 15 is determined in the range shown by Expression (1) or Expression (2), the maximum number of the slits 15 provided in one magnetic pole of the rotor core 11 is defined as $b_{max}$, and the range of $b_{max}$ is determined in accordance with the following Expression (3). It is noted that P is the number of magnetic poles in the rotor core 11.

$$(2b_{max}-1)\times\theta\leq360/P \quad (3)$$

The $b_{max}$ determined in accordance with Expression (3) is the maximum natural number that satisfies Expression (3).

Where the inner edge of the $b_{max}$th slit is set as the maximum number $n_{max}$ of the arcs corresponding to the maximum number $b_{max}$ of the slits 15 that can be provided in one magnetic pole of the rotor core 11, the maximum number $n_{max}$ of the arcs is two times the maximum number $b_{max}$. That is, $n_{max}=2b_{max}$ is satisfied. For example, in the configuration in FIG. 16, $b_{max}$ is 3 and $n_{max}$ is 6. It is noted that the provided slits 15 have symmetric shapes with respect to the d axis and the q axis.

As shown in FIG. 16, each arc has an arc center Q on the q axis at a distance D from the cylinder outer circumferential surface of the rotor core 11. In addition, the radius of the nth arc with respect to each arc center Q(n) is denoted by R(n), and the distance D determined by the nth arc is denoted by D(n). Here, the ratio between the distance D(n) and the radius R(n) of the nth arc is denoted by k(n), and the ratio k(n) between the distance D(n) and the radius R(n) is defined as shown by the following Expression (4).

$$k(n)=D(n)/R(n) \quad (4)$$

The distance D(n) is a constant determined by the nth arc, and a value that can be taken by the radius R(n) of the nth arc changes in accordance with the ratio k(n) for the nth arc. Here, the ratio k(n) satisfies a relationship shown by the following Expression (5).

$$k(n_{max})<\ldots<k(n)<\ldots<k(1)<1 \quad (5)$$

The term "arc" includes also a shape similar to an arc shape, approximately formed by straight lines or the like, for example.

A method for determining the distance D(n), the radius R(n), and the ratio k(n) will be described.

In FIG. 16, a point corresponding to the radius of the rotor 7 on the q axis is set as a point X, and points where the $n_{max}$th arc intersects the outer circumferential surface of the rotor core 11 are set as a point Y and a point Y'. When $b_{max}$ is determined on the basis of Expression (3), the maximum value $n_{max}$ that can be taken by the arcs can be determined. The ratio $k(n_{max})$ is determined in a range shown by the following Expression (6). A calculation method for Expression (6) will be described in detail later.

$$0.20 \leq k(n_{max}) \leq 0.37 \quad (6)$$

The radius $R(n_{max})$ of the $n_{max}$th arc is a radius of a circle passing the point Y and the point Y', and the arc center Q thereof is present on the q axis. Therefore, when the ratio $k(n_{max})$ is determined, the radius $R(n_{max})$ and the distance $D(n_{max})$ of the $n_{max}$th arc are determined on the basis of Expression (4).

It is noted that FIG. 16 shows a case of D(1)>D(2)>D(3)>D(4)>D(5)>D(6), but without limitation to the order shown in FIG. 16, D(n) may be determined so as to satisfy Expressions (5) and (6).

Next, an analysis model used in the electromagnetic field analysis will be described. FIG. 17 to FIG. 21 are sectional views of the rotor 7 of the synchronous reluctance motor 1 having six poles and thirty-six slots according to embodiment 2. As the stator 6, the stator of the synchronous reluctance motor 1 having six poles and thirty-six slots according to embodiment 1 shown in FIG. 3 is used. As an example for showing effects, a model in which the interval θ of the slits 15 is 6.66° was created. It is noted that the number of slits 15 is three in the model, but is not limited thereto. An angle s is an angle of the slit width 21 at the rotor outer circumferential surface end of the first slit 15. That is, the angle s is an angle formed by a line passing the center O and a point where the first arc intersects the rotor outer circumferential surface end, and a line passing the center O and a point where the second arc intersects the rotor outer circumferential surface end. Similarly, an angle t is an angle of the slit width 21 at the rotor outer circumferential surface end of the second slit 15, and an angle u is an angle of the slit width 21 at the rotor outer circumferential surface end of the third slit 15.

Figure 17:
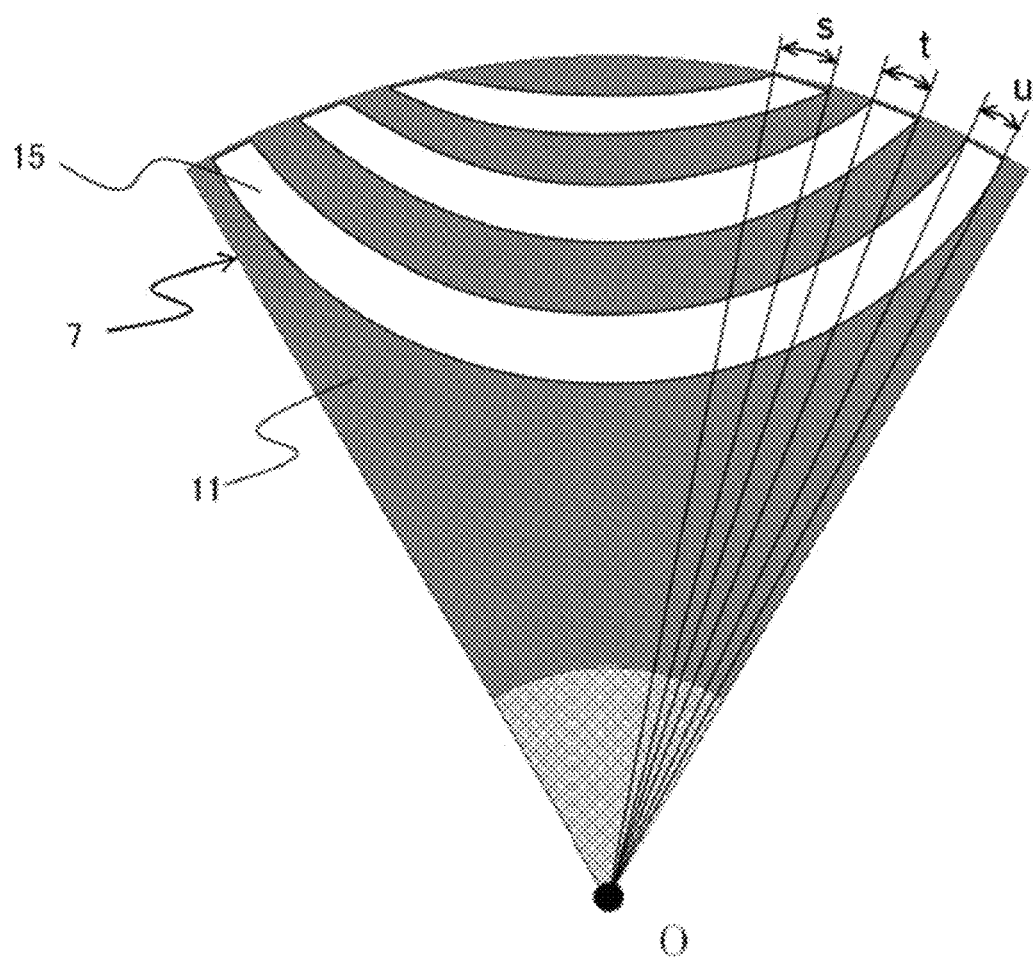
FIG. 17 is a sectional view showing the rotor of the synchronous reluctance motor having six poles and thirty-six slots according to embodiment 2 for carrying out the present invention.
Figure 18:
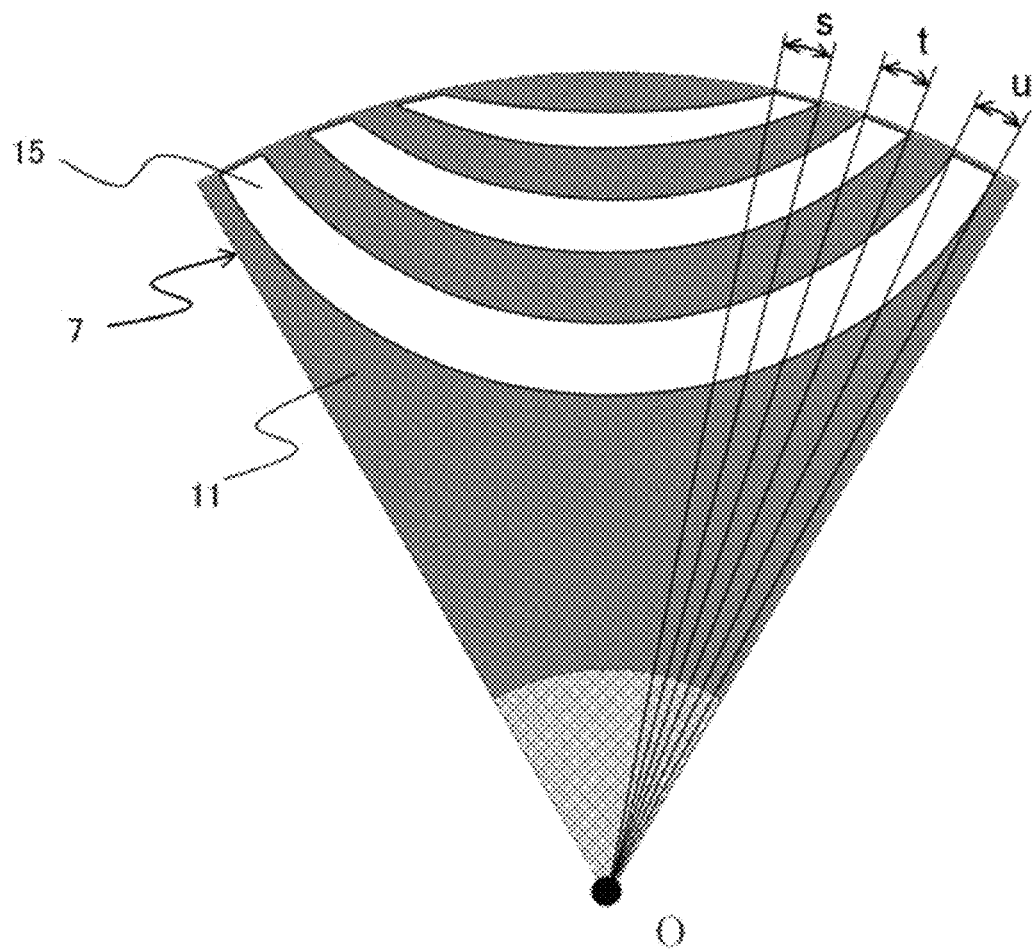
FIG. 18 is a sectional view showing the rotor of the synchronous reluctance motor having six poles and thirty-six slots according to embodiment 2 for carrying out the present invention.
Figure 19:
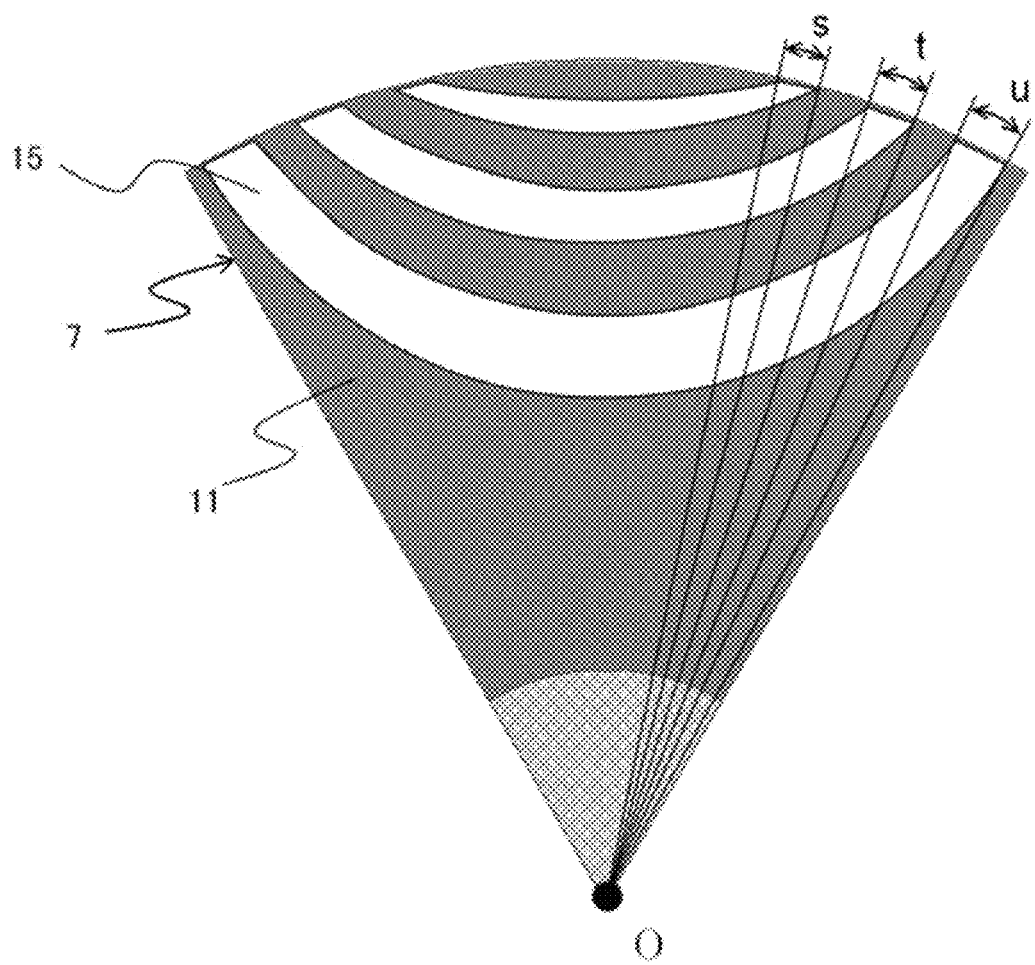
FIG. 19 is a sectional view showing the rotor of the synchronous reluctance motor having six poles and thirty-six slots according to embodiment 2 for carrying out the present invention.

FIG. 17 shows a model designed such that the angles of the slit widths 21 of the respective slits 15 at the outer circumferential surface end of the rotor core 11 satisfy s>t>u, FIG. 18 shows a model designed such that the angles of the respective slit widths 21 satisfy s=t=u, and FIG. 19 shows a model designed such that the angles of the respective slit widths 21 satisfy s<t<u.

Figure 20:
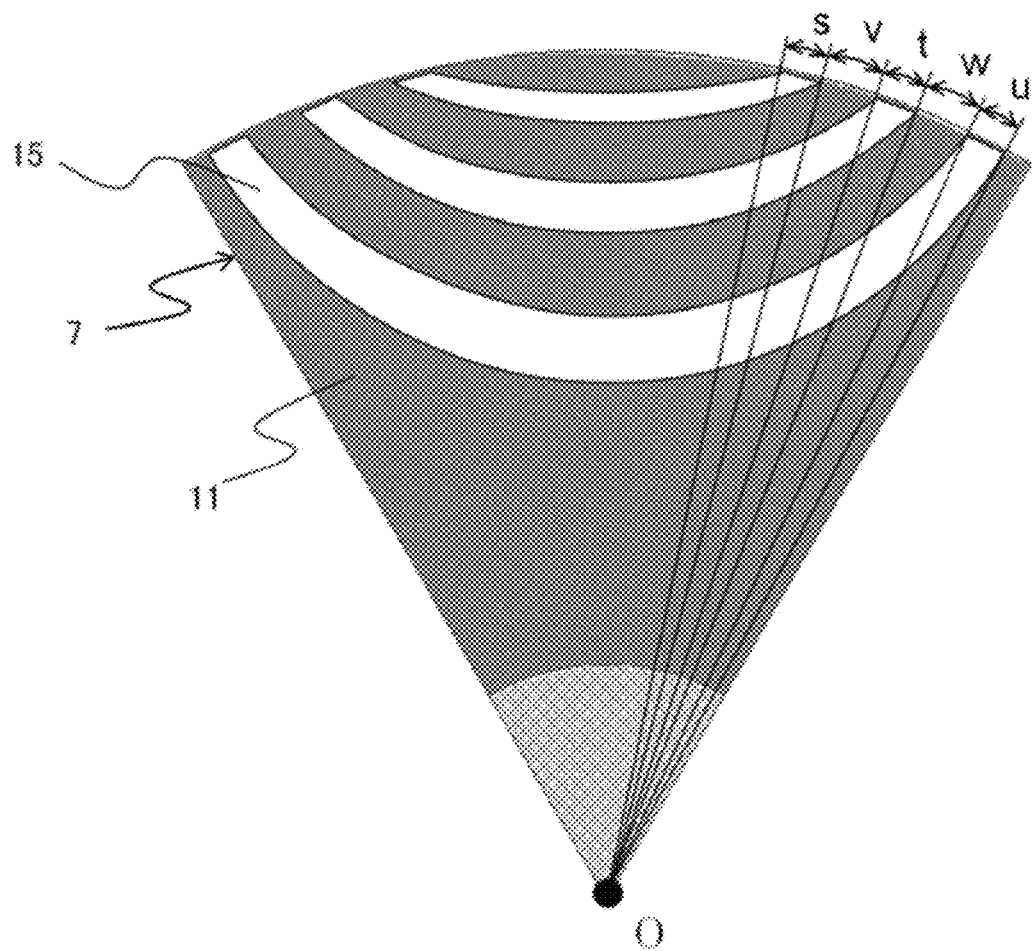
FIG. 20 is a sectional view showing the rotor of the synchronous reluctance motor having six poles and thirty-six slots according to embodiment 2 for carrying out the present invention.
Figure 21:
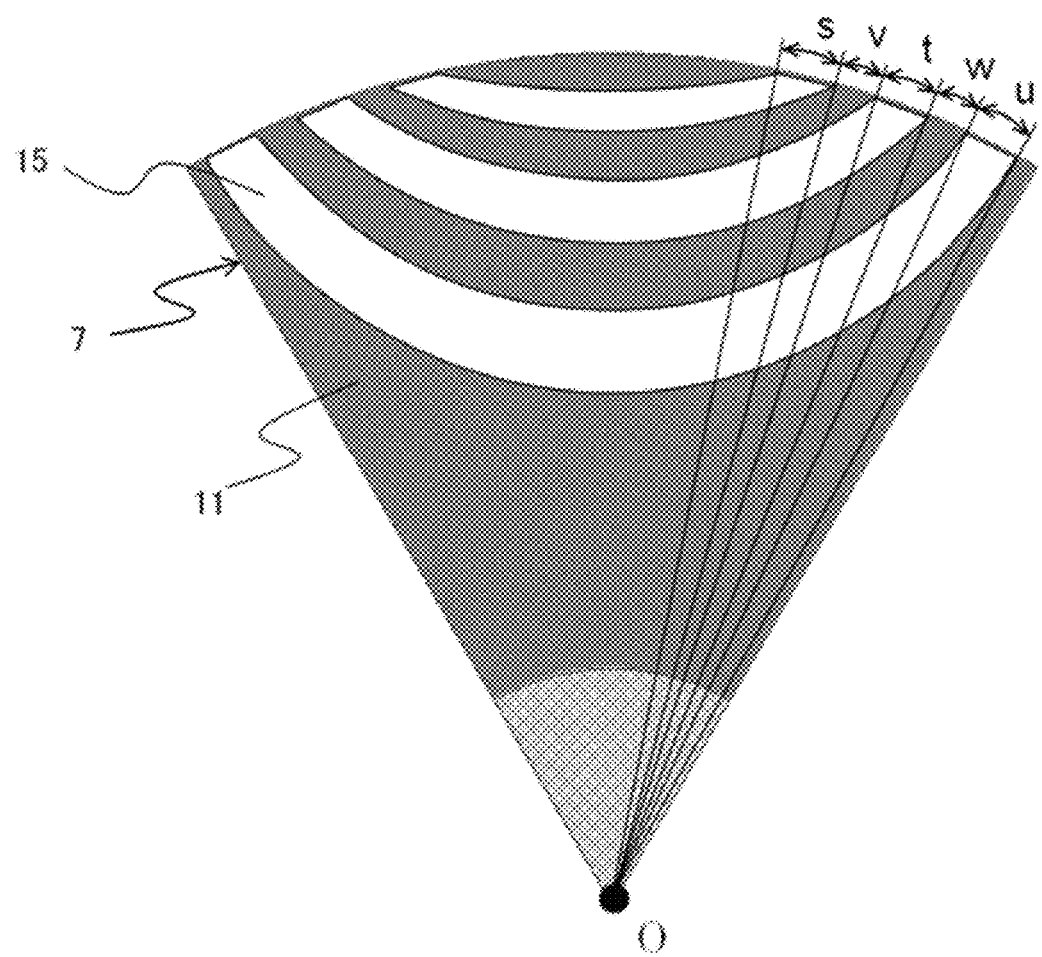
FIG. 21 is a sectional view showing the rotor of the synchronous reluctance motor having six poles and thirty-six slots according to embodiment 2 for carrying out the present invention.

In FIG. 20 and FIG. 21, an angle v is an angle of the core width 22 at the rotor outer circumferential surface end between the first slit 15 and the second slit, i.e., an angle formed by a line passing the center O and a point where the second arc intersects the outer circumferential surface of the rotor core 11, and a line passing the center O and a point where the third arc intersects the outer circumferential surface of the rotor core 11. Similarly, an angle w is an angle of the core width 22 at the outer circumferential surface of the rotor core 11 between the second slit 15 and the third slit.

FIG. 20 shows a model designed such that the angles of the respective slit widths 21 and the angles 22 of the respective core widths satisfy (s=t=u)<(v=w), and FIG. 21 shows a model designed such that the angles of the respective slit widths 21 and the angles 22 of the respective core widths satisfy (s=t=u)>(v=w).

FIG. 22 shows an example of a relationship of angular dimensions in FIG. 17 to FIG. 21, in the synchronous reluctance motor 1 having six poles and thirty-six slots according to embodiment 2. Here, the model 111 is shown in FIG. 17, the model 112 is shown in FIG. 18, the model 113 is shown in FIG. 19, the model 114 is shown in FIG. 20, the model 115 is shown in FIG. 21, and the angular dimensions of the angles s, t, u, v, w used in the analysis at this time are shown as a list table in FIG. 22.

Figure 23:
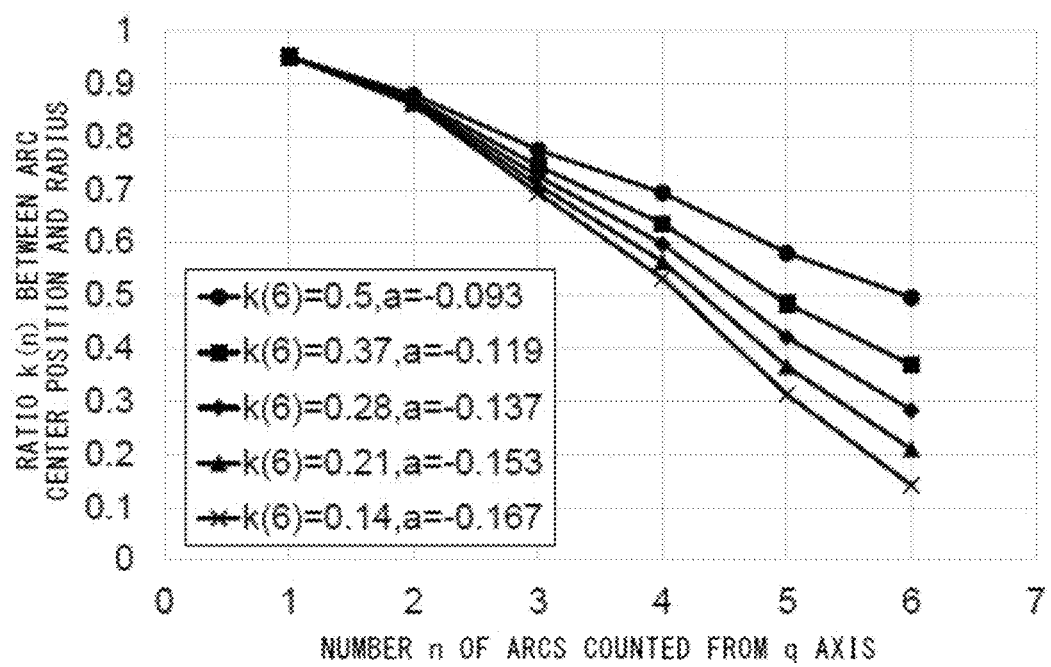
FIG. 23 illustrates examples of a ratio $k(n_{max})$ in the synchronous reluctance motor having six poles and thirty-six slots according to embodiment 2 for carrying out the present invention.

FIG. 23 illustrates examples of the ratio k(n) in the synchronous reluctance motor 1 having six poles and thirty-six slots according to embodiment 2. FIG. 23 shows the ratio k(n) determined on the basis of Expression (4) for the model 111. The ratio k(1) for the first arc is set to be constant, and with respect to each ratio $k(n_{max})$ for the $n_{max}$th arc, the ratios k(n) for the second to ($n_{max}$−1)th arcs counted from the q axis are determined in accordance with the slit widths 21 shown in FIG. 22. In FIG. 23, a is a slope when the values of the ratios k(n) for the first to $n_{max}$th arcs are linearly approximated. That is, in a graph with n set on the horizontal axis and the ratio k(n) set on the vertical axis, the values of the ratios k(1) to $k(n_{max})$ are plotted, and a slope when the plotted points are linearly approximated is denoted by a.

Relationships of output torque with respect to the ratio $k(n_{max})$ and torque ripple with respect to the ratio $k(n_{max})$ will be discussed using electromagnetic field analysis by a finite element method, with the winding 10 of the stator 6 energized. In the discussion, analysis was performed using the synchronous reluctance motor 1 having six poles and thirty-six slots. However, the application range of the effects is not limited to the case where the number P of the magnetic poles and the number S of the slots are these values.

Figure 24:
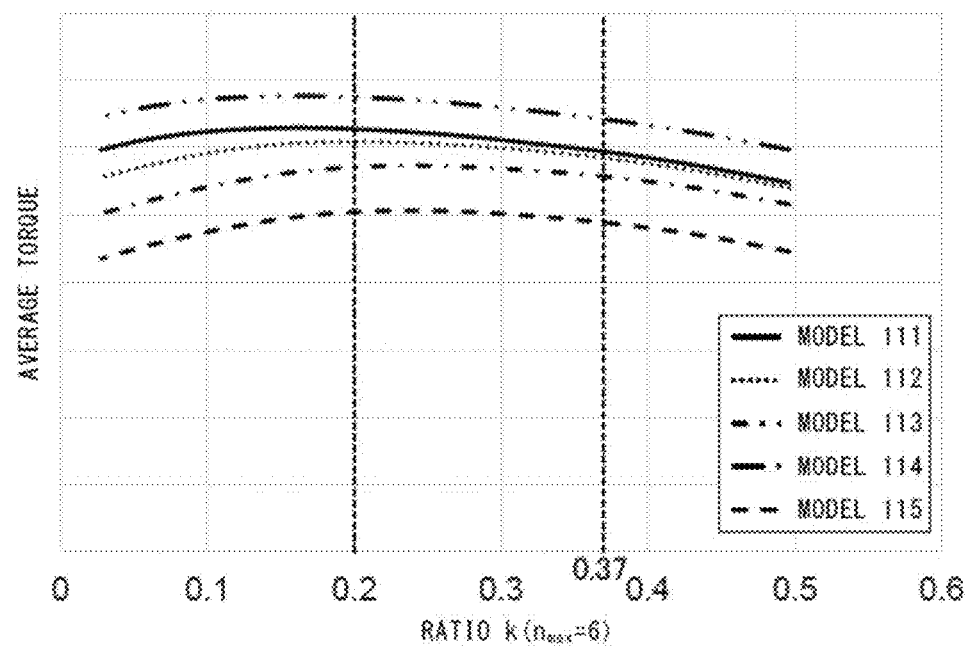
FIG. 24 illustrates a relationship of output torque with respect to the ratio $k(n_{max})$ in the synchronous reluctance motor having six poles and thirty-six slots according to embodiment 2 for carrying out the present invention.

FIG. 24 illustrates a relationship of output torque with respect to the ratio $k(n_{max})$ in the synchronous reluctance motor 1 having six poles and thirty-six slots according to embodiment 2. A solid line indicates an analysis result of the model 111, a dotted line indicates an analysis result of the model 112, a dotted-dashed line indicates an analysis result of the model 113, a two-dot dashed line indicates an analysis result of the model 114, and a broken line indicates an analysis result of the model 115. For each model, such a range of the ratio $k(n_{max})$ that the average torque becomes equal to or greater than 98% of the maximum value of output torque, within a range of $0.02 \leq k(n_{max}) \leq 0.5$, was calculated.

Figure 25:
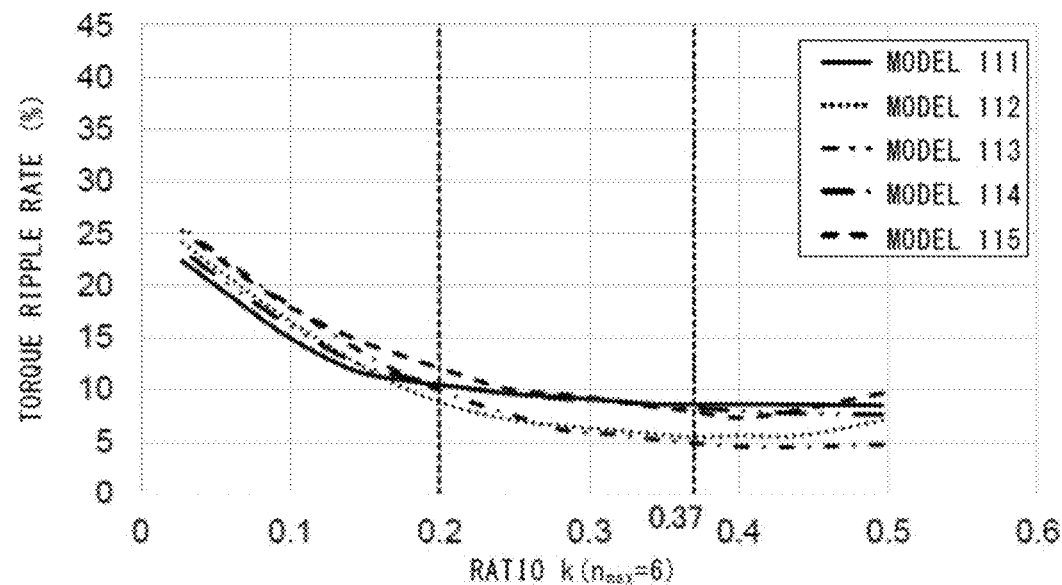
FIG. 25 illustrates a relationship of torque ripple with respect to the ratio $k(n_{max})$ in the synchronous reluctance motor having six poles and thirty-six slots according to embodiment 2 for carrying out the present invention.

FIG. 25 illustrates a relationship of the torque ripple rate with respect to the ratio $k(n_{max})$, in the synchronous reluctance motor 1 having six poles and thirty-six slots according to embodiment 2. As in FIG. 24, a solid line indicates an analysis result of the model 111, a dotted line indicates an analysis result of the model 112, a dotted-dashed line indicates an analysis result of the model 113, a two-dot dashed line indicates an analysis result of the model 114, and a broken line indicates an analysis result of the model 115. For each model, such a range of the ratio $k(n_{max})$ that the torque ripple rate does not exceed +5% from the minimum value, within a range of $0.02 \leq k(n_{max}) \leq 0.5$, was calculated.

From the analysis results in FIG. 24 and FIG. 25, it has been found out that a range that satisfies each constraint condition for the average torque with respect to the ratio $k(n_{max})$ and the torque ripple rate with respect to the ratio $k(n_{max})$, is the range shown by Expression (6) for the $n_{max}$th arc.

In a case where the ratio $k(n_{max})$ for the $n_{max}$th arc is in the range shown by Expression (6), the convex shape of the slit 15 has such a form that a magnetic flux generated by the magnetomotive force of the stator 6 readily passes. Thus, the difference between the inductances on the d axis and the q axis increases, whereby higher output torque and more reduced torque ripple can be achieved than in the synchronous reluctance motor 1 according to embodiment 1.

Figure 26:
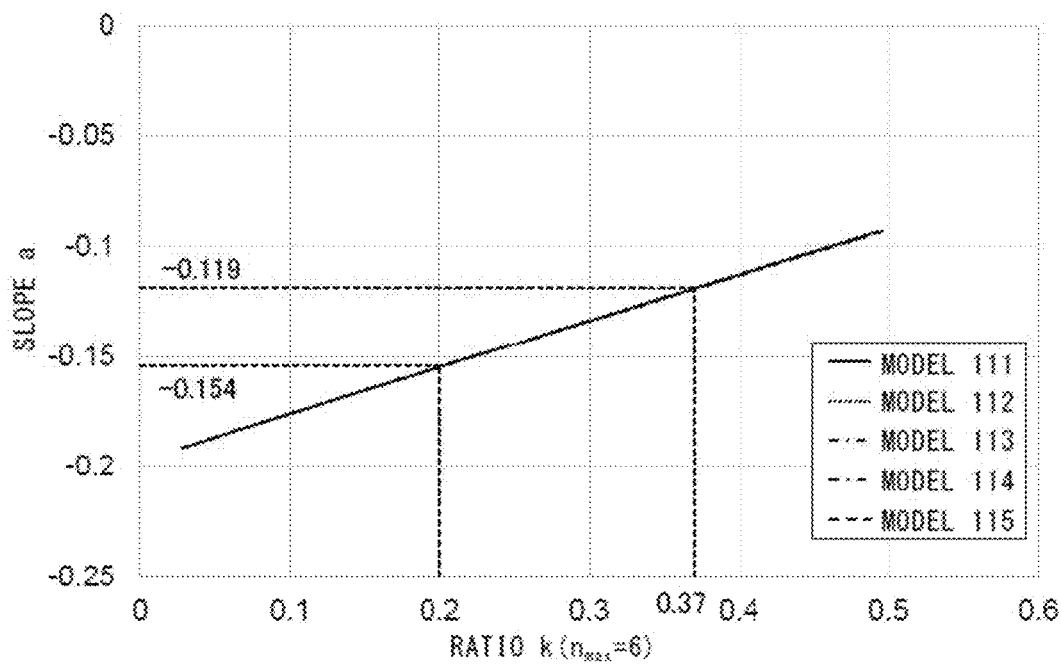
FIG. 26 illustrates a relationship of a slope a with respect to the ratio $k(n_{max})$ in the synchronous reluctance motor having six poles and thirty-six slots according to embodiment 2 for carrying out the present invention.

FIG. 26 illustrates a relationship of the slope a when the values of the ratios $k(1)$ to $k(n_{max})$ are linearly approximated, in the synchronous reluctance motor 1 having six poles and thirty-six slots according to embodiment 2. The horizontal axis in FIG. 26 indicates the ratio $k(n_{max})$ (in embodiment 2, $n_{max}=6$) for the $n_{max}$th arc, and the vertical axis in FIG. 26 indicates the slope a. In FIG. 26, as in FIG. 24 and FIG. 25, a solid line indicates a relationship of the ratio $k(n)$ and the slope a for the model 111, a dotted line indicates a relationship of the ratio $k(n)$ and the slope a for the model 112, a dotted-dashed line indicates a relationship of the ratio $k(n)$ and the slope a for the model 113, a two-dot dashed line indicates a relationship of the ratio $k(n)$ and the slope a for the model 114, and a broken line indicates a relationship of the ratio $k(n)$ and the slope a for the model 115. Since the models 111 to 115 are the same in the point Y and the point Y', it is considered that, among the models 111 to 115, the slope a with respect to the ratio $k(n_{max})$ for the $n_{max}$th arc is the same, as a result of approximation.

The range of the ratio $k(n_{max})$ shown by Expression (6), which satisfies the constraint conditions for the average torque with respect to the ratio $k(n_{max})$ and the torque ripple rate with respect to the ratio $k(n_{max})$, can be calculated as a range where the slope a is $-0.154 \leq a \leq -0.119$, from FIG. 26.

Figure 27:
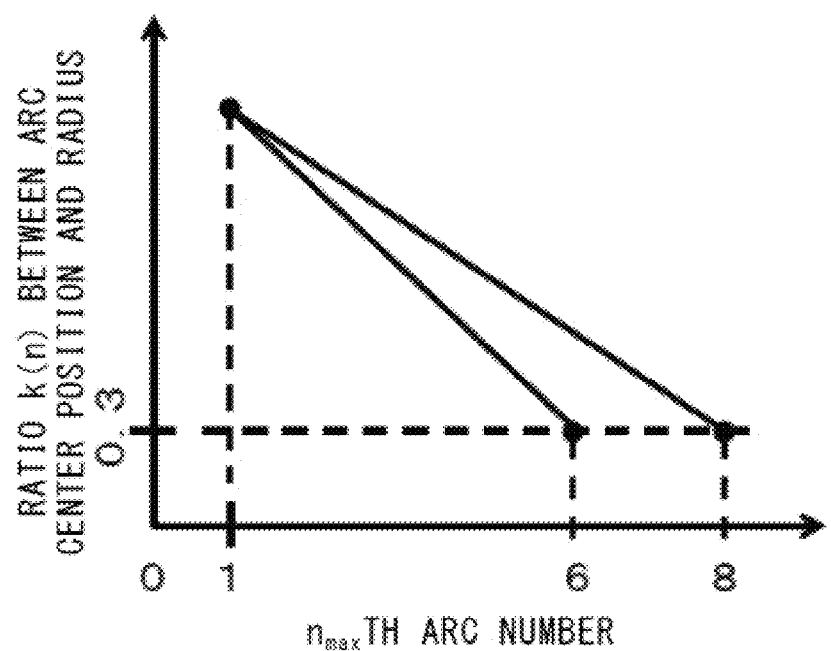
FIG. 27 illustrates a relationship of the ratio $k(n_{max})$ with respect to the number n of arcs in the synchronous reluctance motor according to embodiment 2 for carrying out the present invention.

FIG. 27 illustrates a relationship of the ratio $k(n)$ with respect to the nth arc, in the synchronous reluctance motor 1 according to embodiment 2. FIG. 27 indicates that the slope a varies even when the ratio $k(n_{max})$ for the $n_{max}$th arc is the same, i.e., the slope a varies depending on the number of the slits 15. For example, in a case where the maximum value $n_{max}$ of the arc n is 6, i.e., three slits 15 are provided, the slope a is 4/3 of the slope a in a case where the maximum value $n_{max}$ of the arc n is 8, i.e., four slits 15 are provided. For generalization, the preferred range of the slope a is represented as follows, using the arc n.

From FIG. 26, the preferred range of the slope a can be represented as $(-0.154 \times n/n_{max}) \leq a \leq (-0.119 \times n/n_{max})$, i.e., a range shown by the following Expression (7). Here, n is the maximum value of the arc in embodiment 2 (n=6), and the maximum value $n_{max}$ that can be taken by the arc n is two times the number $b_{max}$ of the slits 15 determined on the basis of Expression (3).

$$(-0.92/n_{max}) \leq a \leq (-0.71/n_{max}) \quad (7)$$

In the synchronous reluctance motor according to embodiment 2, for the case of the $n_{max}$th arc, the ratio $k(n_{max})$ between the radius $R(n_{max})$ of the $n_{max}$th arc passing the point Y and the point Y', and the distance $D(n_{max})$ from the arc center Q of the circle having the radius $R(n_{max})$ to the point X, is determined in the range shown by Expression (6). The radius $R(n)$ for the ratio $k(n)$ of the nth arc is defined by Expression (4), and the ratio $k(n)$ is determined so as to satisfy the relationship of Expression (5) and such that the slope a when the values of the ratios $k(1)$ to $k(n_{max})$ are linearly approximated is within the range of Expression (7). It is noted that, in a case where the first to $(n_{max}-1)$th arcs are provided with a constant slope a, the ratio $k(n)$ is determined by the following Expression (8).

$$k(n) = k(n_{max}) - \{a \times (n_{max}-n)\} \quad (8)$$

However, the first to $(n_{max}-1)$th arcs need not be determined so as to be arranged at equal intervals from the $n_{max}$th arc with a constant slope a, and may be determined such that the slope a of the ratio $k(n)$ for the first to $n_{max}$th arcs becomes, by approximation, within the range shown by Expression (7).

When the ratio $k(n)$ for the nth arc is determined, Y and Y' are determined from θ, so that the distance $D(n)$ and the radius $R(n)$ are determined, and on the basis of Expression (4), the radius $R(n)$ for the ratio $k(n)$ of each of the first to $(n_{max}-1)$th arcs is determined. When the distance $D(n_{max})$ is determined, the position of the arc center Q is also determined, and therefore each interval between the first to $n_{max}$th arcs is determined by the radius $R(n)$. Thus, the slit width 21 and the core width 22 are also determined.

From the above, when the interval θ of the slits 15 is determined in the range of Expression (1) or Expression (2), the number $b_{max}$ of the slits 15 per magnetic pole is determined in accordance with Expression (3), and the maximum value $n_{max}$ that can be taken by the arc, which is two times the $b_{max}$, is determined. The values of the ratios $k(1)$ to $k(n)$ for the first to nth arcs are determined so that the ratio $k(n_{max})$ for the $n_{max}$th arc is in the range shown by Expression (6), the ratio $k(n)$ for the nth arc satisfies the relationship of Expression (5), and the slope a when the values of the ratios $k(1)$ to $k(n_{max})$ are linearly approximated is in the range of Expression (7). Thus, both of high output torque and reduced torque ripple can be achieved.

In FIG. 24, higher output torque can be produced in the model 111 than in the model 112 which has uniform slit widths 21, and high output torque can be produced also in the model 114. This is an effect obtained by the following. The slope a is set in the range shown by Expression (7) and in particular, the width of the slit 15 close to the d axis on which a large amount of magnetic flux passes is made narrower than the core width 22, whereby magnetic saturation in the vicinity of the d axis is relaxed and the d-axis inductance is increased.

In FIG. 25, in a case where the ratio $k(n_{max})$ for the $n_{max}$th arc is in the range shown by Expression (6), the torque ripple rate is within a range of +5% from the minimum value. This is because, in each model, the timing of change in the permeance of the rotor 7 due to the arc shape of the slit 15 determined by the ratio $k(n_{max})$ greatly differs from the timing of change in the permeance of the stator 6, so that pulsation of output torque is canceled out.

In the synchronous reluctance motor 1 according to embodiment 2, the number $b_{max}$ of the slits 15 per magnetic pole is determined in accordance with Expression (3), and the maximum value $n_{max}$ that can be taken by the arc n, which is two times the $b_{max}$, is determined. The slits 15 are provided such that the ratio $k(n_{max})$ for the $n_{max}$th arc is in the range shown by Expression (6), the ratio $k(n)$ for the nth arc satisfies the relationship of Expression (5), and the slope a when the values of the ratios $k(1)$ to $k(n_{max})$ are linearly approximated is within the range of Expression (7).

As a result, magnetic saturation in the rotor core 11 is relaxed and the d-axis inductance is increased, whereby higher output torque than in the synchronous reluctance motor 1 according to embodiment 1 can be achieved. In addition, owing to change in the permeance of the rotor 7 due to change in the arc shape of the slit 15, the timing of change in the permeance of the stator 6 and the timing of change in the permeance of the rotor 7 become more different from each other, whereby pulsation of output torque is canceled out and thus increase in torque ripple due to the interval of the slots 14 of the stator 6 can be further suppressed.

Embodiment 3

A synchronous reluctance motor 1 according to embodiment 3 for carrying out the present invention has a feature that a cutout 31 is provided to the outer circumferential surface of the rotor core 11.

Figure 28:
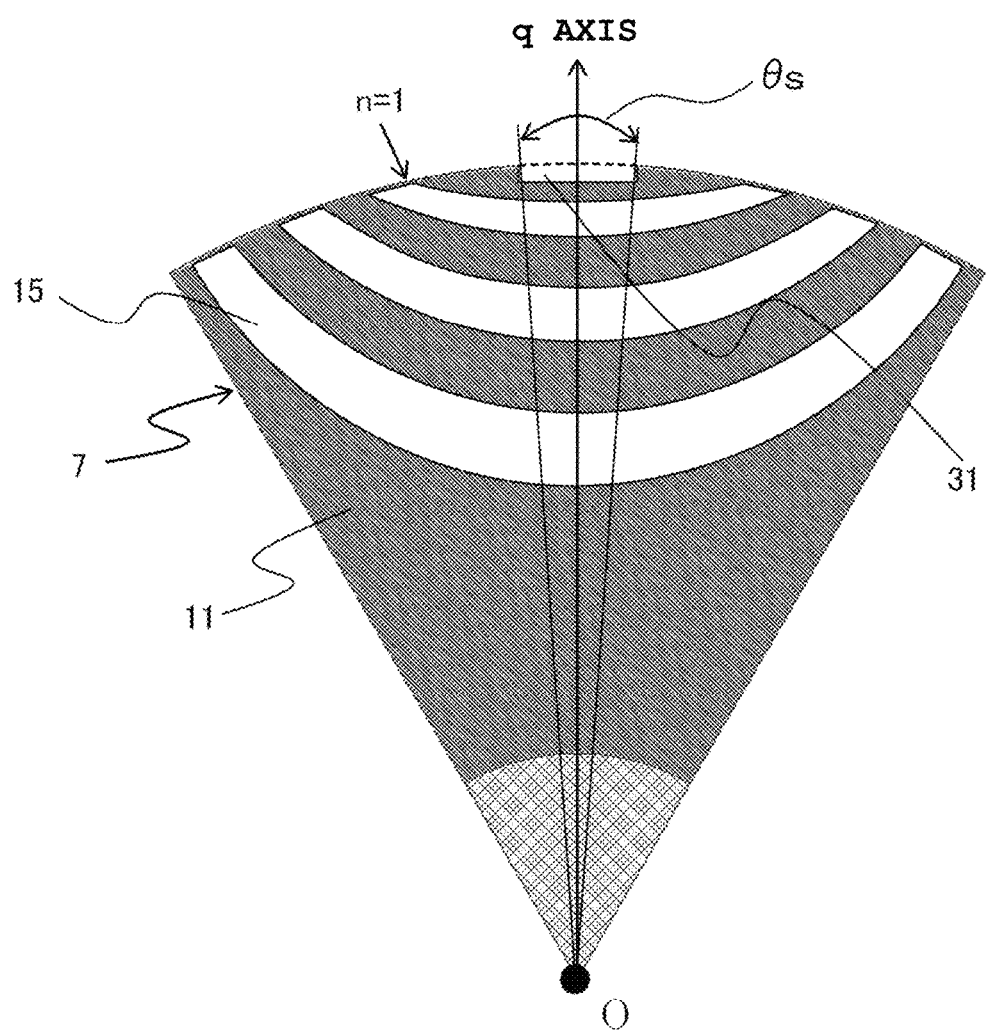
FIG. 28 is a sectional view showing a rotor of a synchronous reluctance motor according to embodiment 3 for carrying out the present invention.

FIG. 28 is a sectional view showing the rotor 7 of the synchronous reluctance motor 1 according to embodiment 3. The synchronous reluctance motor 1 according to embodiment 3 has the cutout 31 on the outer circumferential surface of the rotor core 11 at a part intersecting the q axis. For example, the cutout 31 having a groove shape is provided as shown in FIG. 28. Providing the cutout 31 means providing a nonmagnetic part on the q axis, and thus provides the same effects as those obtained by providing the slit 15. That is, owing to the cutout 31, the q axis inductance is reduced, so that output torque is improved.

Next, effects on torque ripple by providing the cutout 31 will be described. For example, an angle θs (hereinafter, referred to as "interval θs of cutout 31") formed by both ends of the cutout 31 along the outer circumferential surface of the rotor core 11, with respect to the center O of the rotor core 11, may be set to be greater than the interval θ of the slits 15. In this case, permeance change with a long cycle is imparted to the rotor 7, whereby it is possible to reduce a torque ripple component of a lower order than the components due to the interval of the slots 14 of the stator 6, which are to be reduced by the slits 15.

In a case where the interval θs of the cutout 31 is set to be equal to the interval θ of the slits 15, a magnetic circuit equivalent to a case of increasing the number of slits can be formed, so that the torque ripple reducing effect by the slits 15 can be increased.

In a case where the interval θs of the cutout 31 is set to be shorter than the interval θ of the slits 15, permeance change with a short cycle is imparted to the rotor 7, whereby it is possible to reduce a torque ripple component of a higher order than the components due to the interval of the slots 14 of the stator 6, which are to be reduced by the slits 15.

Figure 29:
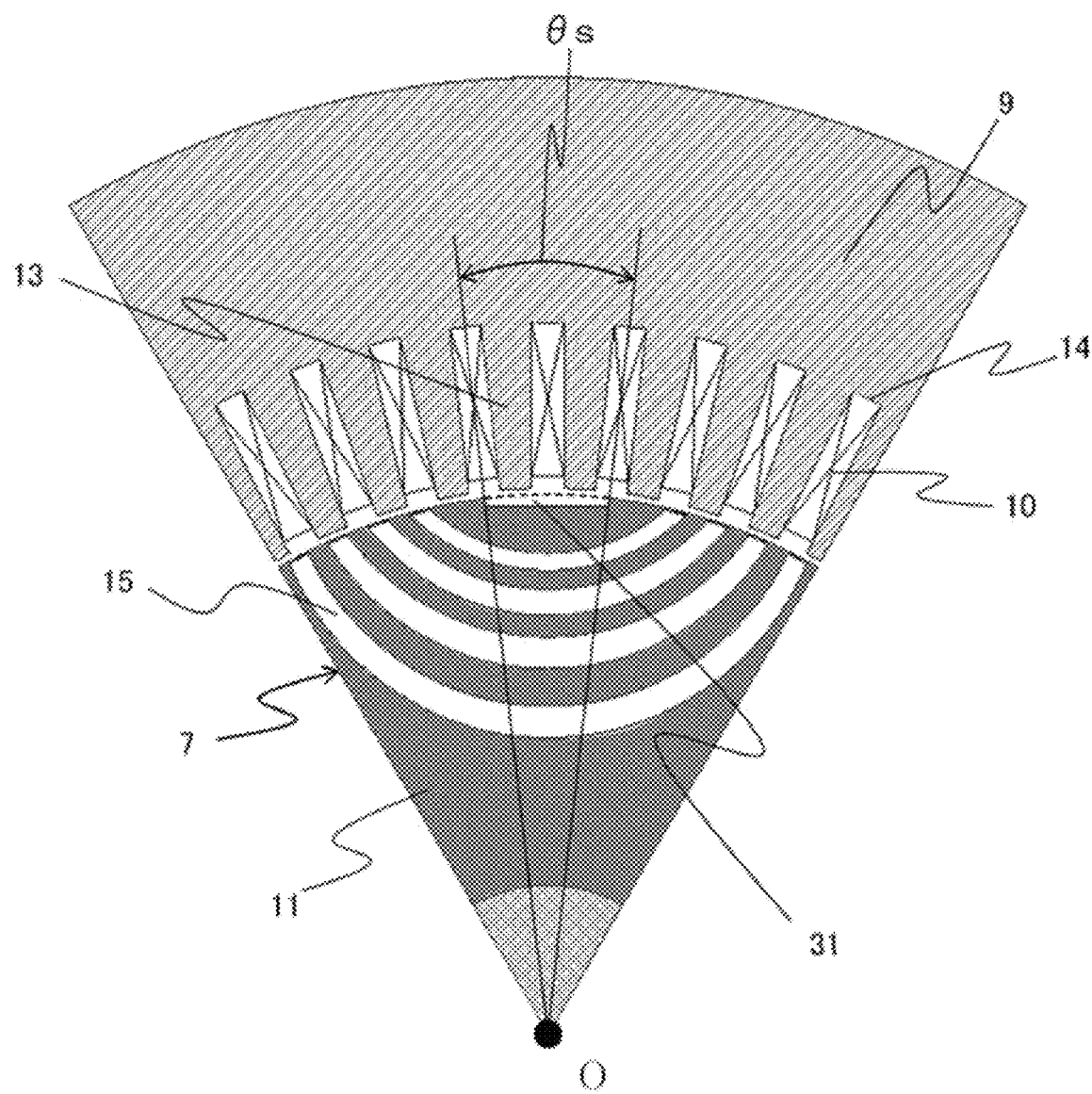
FIG. 29 is a sectional view showing a part for one magnetic pole of the synchronous reluctance motor according to embodiment 3 for carrying out the present invention.

FIG. 29 is a sectional view showing a part for one magnetic pole of the synchronous reluctance motor 1 according to embodiment 3. In the case where the interval θs of the cutout 31 is set to be greater than the interval θ of the slits 15 as described above, it is preferable that the interval θs of the cutout 31 is set to be such a width as not to cover two or more teeth 13, i.e., set to be in a range shown by the following Expression (9). If two or more teeth 13 are covered, magnetic path short circuit occurs between the teeth 13, thus causing increase in, for example, a sixth-order torque ripple component and a torque ripple component due to the interval of the slots 14 of the stator 6.

$$\theta s < 2 \times (360°/S) \quad (9)$$

Preferably, the shape of the cutout 31 described in embodiment 3 is set to be right-left symmetric with respect to the q axis. By setting the shape of the cutout 31 to be right-left symmetric with respect to the q axis, permeance change on the q axis is prevented from being influenced. The number of cutouts 31 is not limited to one.

It is noted that, in the case where the cutout 31 is provided, the outer circumferential surface of the rotor core 11 is recessed radially inward, but the definition of the arc center position in the present invention is based on the shape before the cutout 31 is provided. For example, the arc center position is determined with reference to a broken-line part shown in FIG. 28.

Figure 30:
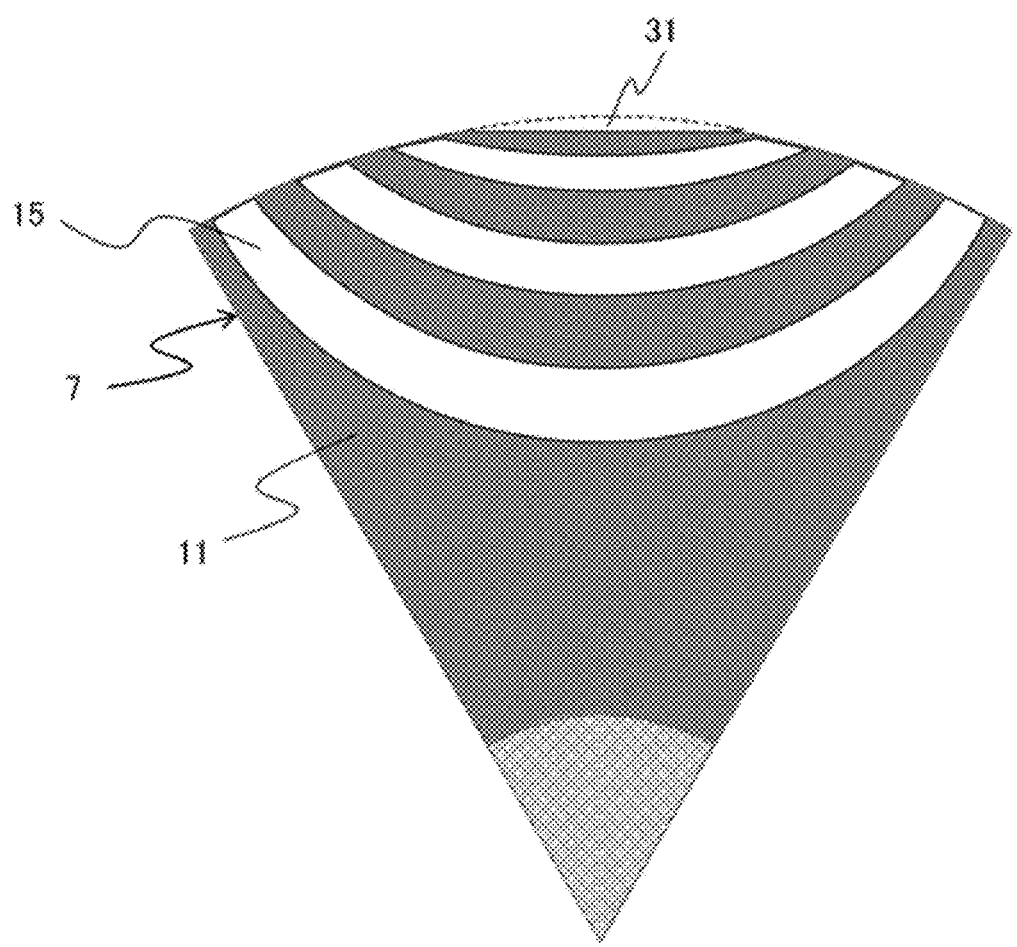
FIG. 30 is a sectional view showing a rotor of the synchronous reluctance motor according to embodiment 3 for carrying out the present invention.

Next, another example of the cutout 31 will be described. FIG. 30 is a sectional view showing the rotor 7 of the synchronous reluctance motor 1 according to embodiment 3. As shown in FIG. 30, the outer circumferential surface of the rotor core 11 at a part intersecting the q axis may be cut. Also in this case, the same effects as in the case of the above cutout 31 can be obtained. It is noted that the shape of the cut surface may be flat or curved. That is, providing the cutout 31 in embodiment 3 means reducing the volume of the rotor core 11 by performing, for example, chipping or cutting of the outer circumferential surface of the rotor core 11 at a part intersecting the q axis.

In the synchronous reluctance motor 1 according to embodiment 3, the cutout 31 is provided to the outer circumferential surface of the rotor core 11 at a part intersecting the q axis, whereby a nonmagnetic part is provided on the q axis. Thus, the q axis inductance is reduced, so that output torque is improved.

In addition, permeance change based on the width of the cutout 31 in accordance with the interval of the slits 15 can be imparted to the rotor core 11, whereby a torque ripple component corresponding to the width of the cutout 31 can be reduced.

Embodiment 4

A synchronous reluctance motor 1 according to embodiment 4 for carrying out the present invention has a feature that a bridge 42 is formed between the slit 15 and the outer circumferential surface of the rotor core 11.

Figure 31:
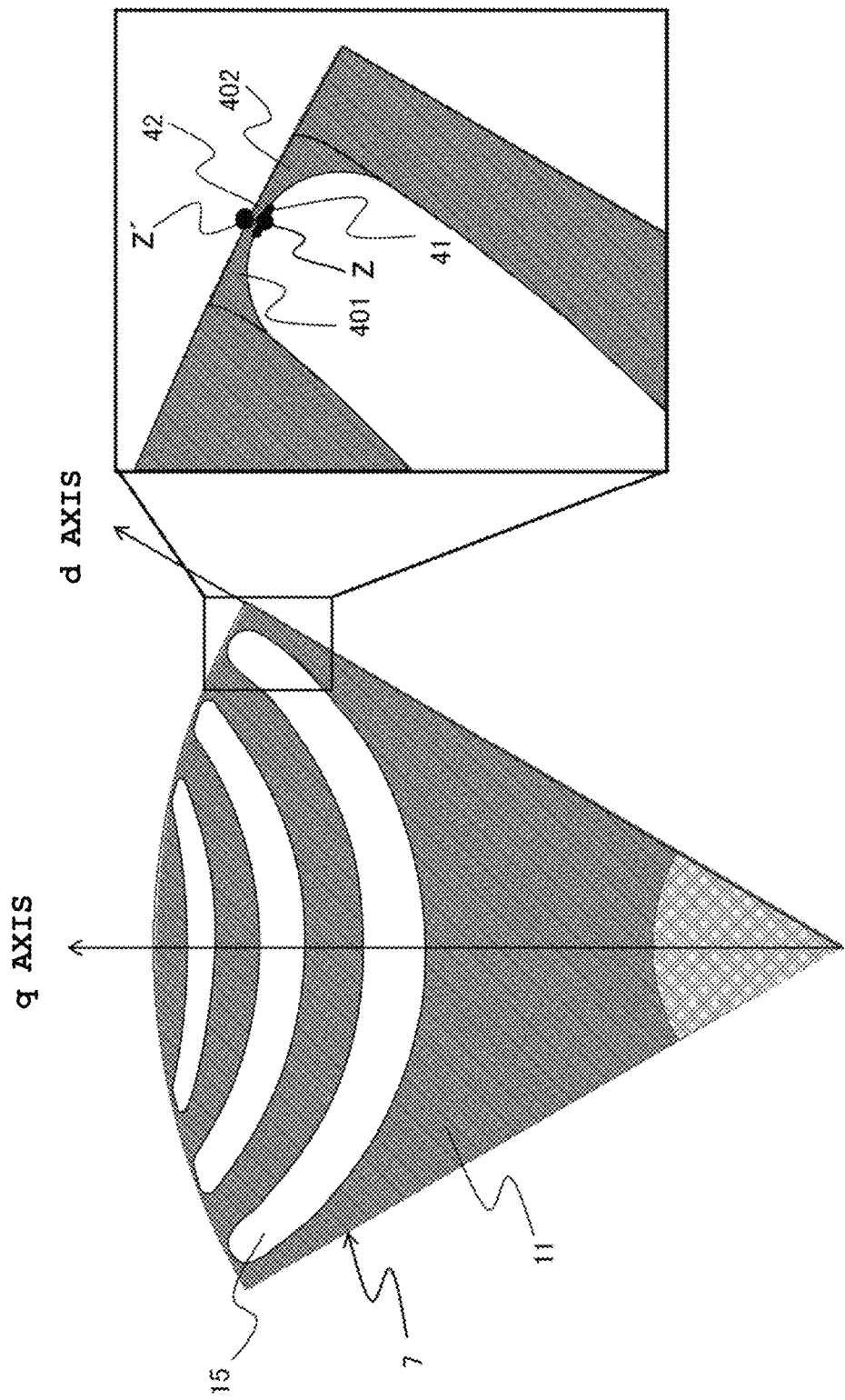
FIG. 31 is a sectional view showing a rotor of a conventional synchronous reluctance motor.

FIG. 31 is a sectional view showing a rotor 7 of a conventional synchronous reluctance motor 1. For high-speed rotation application, the rotor 7 is required to be enhanced in a centrifugal-force withstanding strength.

As a measure against reduction in the centrifugal-force withstanding strength, the following configuration is generally known. As shown in FIG. 31, a circumferential-direction midpoint of an arc that is a part, along the outer circumferential surface of the rotor core 11, of the arc-shaped opening forming the slit 15 is denoted by Z, and an intersection of a perpendicular along the radial direction from the midpoint Z to the outer circumferential surface of the rotor core 11 is denoted by Z'. Then, a chamfered shape (chamfered portion 401 and chamfered portion 402) which is right-left symmetric with respect to a segment ZZ' is formed, thereby improving the strength at the outer circumferential surface end of the rotor core 11 against a centrifugal force acting on the bridge 42 which is a part between the outer circumferential surface of the rotor core 11 and a straight part 41 of the slit 15 opposed to the outer circumferential surface of the rotor core 11. Meanwhile, in order to suppress reduction in electromagnetic performance due to magnetic path short circuit, it is desirable that the bridge 42 is made as thin as possible. However, thinning the bridge 42 leads to reduction in the centrifugal force withstanding strength. In the configuration of the bridge 42 shown in FIG. 31, a necessary chamfer area is large, so that the straight part 41 of the slit 15 opposed to the outer circumferential surface of the rotor core 11 is shortened, thus reducing the magnetic resistance of the bridge 42. As a result, the magnetic path of the bridge 42 becomes likely to be short-circuited.

Figure 32:
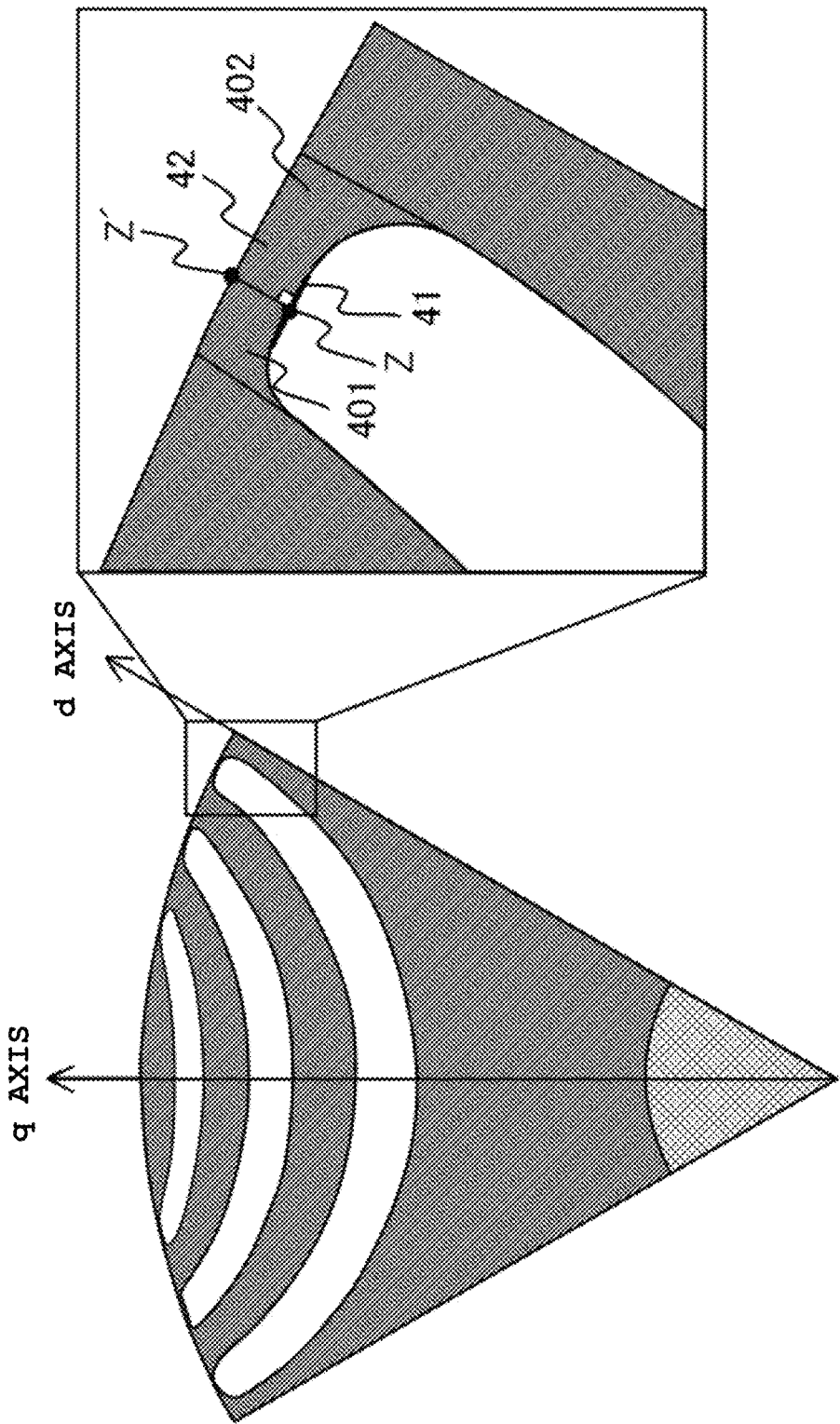
FIG. 32 is a sectional view showing a rotor of a synchronous reluctance motor according to embodiment 4 for carrying out the present invention.

FIG. 32 is a sectional view showing the rotor 7 of the synchronous reluctance motor 1 according to embodiment 4. The synchronous reluctance motor 1 according to embodiment 4 is configured such that the sectional area of the chamfered portion 402 is larger than the sectional area of the chamfered portion 401. That is, as shown in FIG. 32, the synchronous reluctance motor 1 according to embodiment 4 is configured such that the sectional area of the chamfered portion 402 at a part of the rotor core 11 between the segment ZZ' and an extension line along the inner edge of the arc-shaped slit 15 to the outer circumferential surface of the rotor core 11, is larger than the sectional area of the chamfered portion 401 at a part of the rotor core 11 between the segment ZZ' and an extension line along the outer edge of the arc-shaped slit 15 to the outer circumferential surface of the rotor core 11.

In the synchronous reluctance motor 1 according to embodiment 4, the sectional area of the chamfered portion 402 is made larger than the sectional area of the chamfered portion 401, thereby forming a configuration for more bearing a centrifugal force on the d-axis side having high rigidity. Therefore, the straight part 41 of the slit 15 can be made longer than that in the conventional configuration, whereby reduction in the magnetic resistance can be suppressed. Thus, it is possible to form the end shape of the slit 15 of the rotor core 11 so as to have a great centrifugal force withstanding strength, without reducing electromagnetic performance.

Embodiment 5

A synchronous reluctance motor 1 according to embodiment 5 for carrying out the present invention has a feature that the bridges 42 corresponding the respective slits 15 are formed between the slits 15 and the outer circumferential surface of the rotor core 11.

Figure 33:
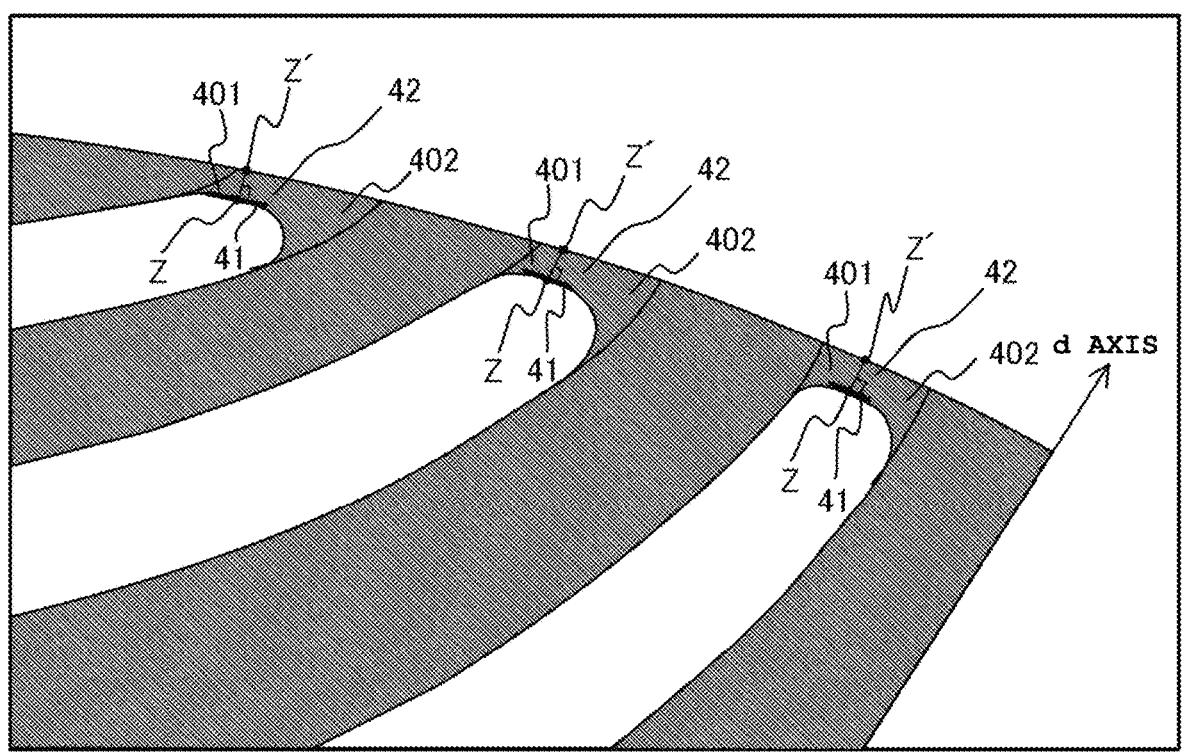
FIG. 33 is an enlarged sectional view showing an end part of slits and a rotor of a synchronous reluctance motor according to embodiment 5 for carrying out the present invention.

FIG. 33 is an enlarged sectional view showing an end part of the slits 15 and the rotor 7 of the synchronous reluctance motor 1 according to embodiment 5. In the synchronous reluctance motor 1 according to embodiment 4, the ratio between the sectional area of the chamfered portion 401 and the sectional area of the chamfered portion 402 is not changed in accordance with each slit 15, whereas, in the synchronous reluctance motor 1 according to embodiment 5, as shown in FIG. 33, the sectional area of the chamfered portion 402 corresponding to the slit 15 closer to the outer circumferential surface of the rotor core 11 is set so that, the ratio of the sectional area of the chamfered portion 402 to the sectional area of the chamfered portion 401 becomes greater.

A centrifugal force acting on the bridge 42 increases as the bridge 42 becomes closer to the d axis. In the synchronous reluctance motor 1 according to embodiment 5, the curvature radius is made smaller for the arc of the slit 15 that is closer to the d axis. That is, in the synchronous reluctance motor 1 according to embodiment 5, for the bridge 42 corresponding to the slit 15 that is closer to the q axis, the ratio of the sectional area of the chamfered portion 402 to the sectional area of the chamfered portion 401 is set to be greater, whereby the end shapes of the slits 15 of the rotor core 11 having a great centrifugal force withstanding strength can be achieved.

In addition, in the synchronous reluctance motor 1 according to embodiment 5, for the slit 15 that is closer to the outer circumferential surface of the rotor core 11, the ratio of the sectional area of the chamfered portion 402 to the sectional area of the chamfered portion 401 is set to be greater. Thus, the straight part 41 of each slit 15 can be made longer and reduction in the magnetic resistance at each slit 15 can be suppressed, whereby electromagnetic performance of the motor can be improved.

Embodiment 6

A synchronous reluctance motor 1 according to embodiment 6 for carrying out the present invention has a feature that a rib 51 is provided to the slit 15.

Figure 34:
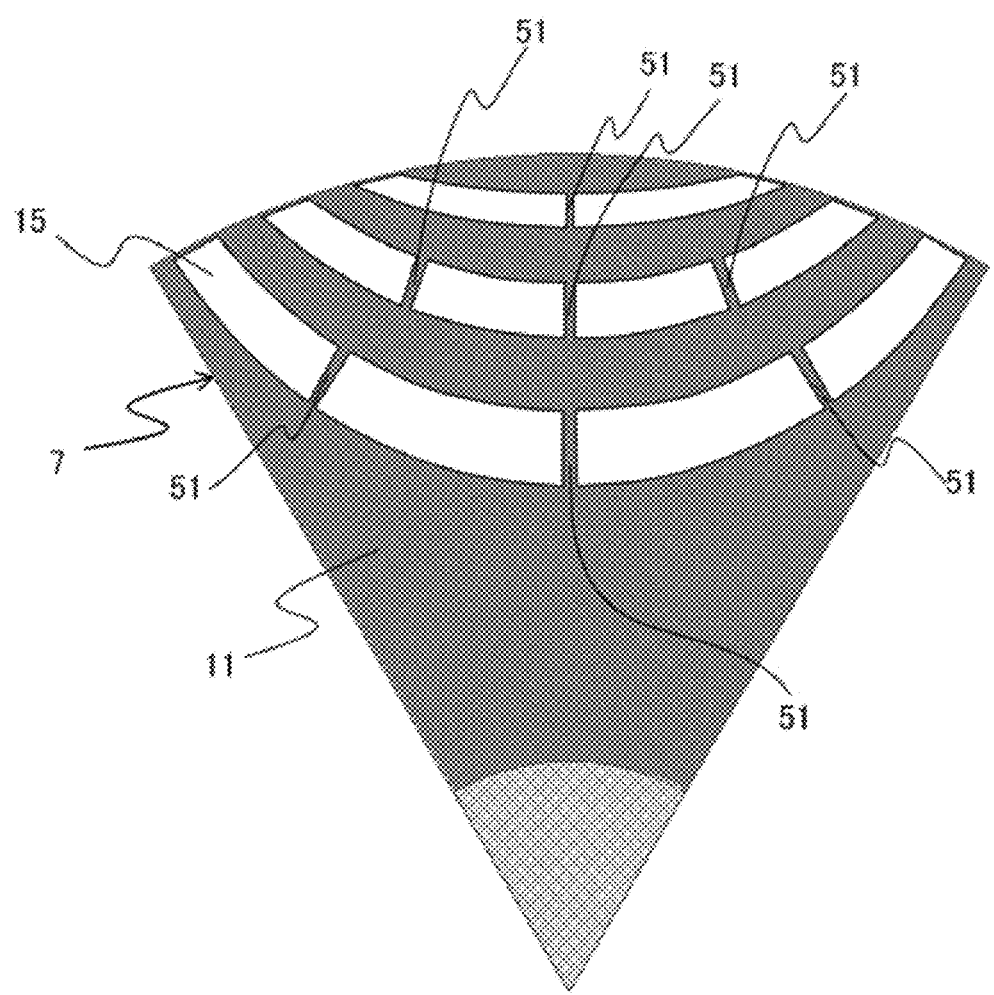
FIG. 34 is a sectional view showing a rotor of a synchronous reluctance motor according to embodiment 6 for carrying out the present invention.

FIG. 34 is a sectional view showing the rotor 7 of the synchronous reluctance motor 1 according to embodiment 6. In order to improve the centrifugal force withstanding strength of the rotor 7, ribs 51 are provided so as to divide the arc-shaped opening forming the slit 15, into a plurality of parts. In the rotor 7 not having such ribs 51 in the slits 15, core layers 22 are separated from each other except at the bridges 42 in the vicinity of the rotor outer circumferential surface. By providing the ribs 51 across the slits 15, the length of a continuous arc in each slit 15 is shortened, so that a bending moment acting on each core layer 22 can be reduced. Thus, the strength of the rotor core 11 can be improved and the load concentrated on the bridge 42 can be reduced, whereby the centrifugal force withstanding strength is improved. In the synchronous reluctance motor 1 according to embodiment 6, the number of the ribs 51 and the positions of the ribs 51 are not limited to those shown in FIG. 34.

The present invention is not limited to the configurations described in embodiments 1 to 6, and within the scope of the present invention, the above embodiments may be freely combined with each other, or each of the above embodiments may be modified or simplified as appropriate.

DESCRIPTION OF THE REFERENCE CHARACTERS

1 synchronous reluctance motor
2 power supply line
3 control device
4 shaft
5 frame
6 stator
7 rotor
8 bearing
9 stator core
10 winding
11 rotor core
12 core back
13 tooth
14 slot
15 slit
21 slit width
22 core width
31 cutout
41 straight part
42 bridge
51 rib
401, 402 chamfered portion

The invention claimed is:
1. A synchronous reluctance motor comprising:
an annular stator core having S slots arranged at equal intervals along an inner circumferential surface thereof;
a winding stored in each of the slots; and
a cylindrical rotor core provided on an inner surface side of the stator core and having P magnetic poles, the rotor core having, for each magnetic pole, a plurality of slits formed by arc-shaped openings which are convex toward a cylinder center and whose apexes are positioned on a q axis, as seen in a center axis direction of the cylinder, wherein
an angle θ formed with respect to the cylinder center by circumferential-direction midpoints of short-side-direction arcs along an outer circumferential surface of the rotor core, of the openings of the adjacent slits, is the same among the respective adjacent slits, an angle formed with respect to the cylinder center by a d axis and the midpoint of the slit closest to the d axis is θ/2,
where
a number of the plurality of slits provided in one pole of the rotor core is denoted by $b_{max}$,
of the plurality of slits, the slit closest to the outer circumferential surface of the rotor core is defined as a first slit,
with b and n defined as integers not less than 1, at a bth slit from the outer circumferential surface of the rotor core toward the cylinder center, an inner edge close to the cylinder center, of the opening forming the bth slit is defined as a (n=2b)th arc, and an outer edge opposed to the inner edge, of the opening forming the bth slit is defined as a (n=2b−1)th arc, and
an arc of an inner edge of a $b_{max}$th slit closest to the cylinder center is defined as an $n_{max}$th arc,
the nth arc has an arc center point on the q axis at a distance D(n) from the outer circumferential surface of the rotor core,
where a radius of the nth arc with respect to the arc center point is denoted by R(n),
a ratio k(n) between the distance D(n) and the radius R(n) is defined as k(n)=D(n)/R(n), and
the ratios k(1) to k(n) respectively corresponding to the first to nth arcs are determined such that
a ratio $k(n_{max})$ for the $n_{max}$th arc is in a range of $0.20 \leq k(n_{max}) \leq 0.37$,
the ratio k(n) for the nth arc satisfies a relationship of $k(n_{max}) < \ldots < k(n) < \ldots < k(1) < 1$, and
in a graph with the integer n set on a horizontal axis and the ratio k(n) set on a vertical axis, a slope a when plotted points of values of the ratios k(1) to $k(n_{max})$ are linearly approximated is in a range of $(-0.92/n_{max}) \leq a \leq (-0.71/n_{max})$.

2. The synchronous reluctance motor according to claim 1, wherein
where the distance for the $n_{max}$th arc is denoted by $D(n_{max})$ and the distance for a $(n_{max}-1)$th arc is denoted by $D(n_{max}-1)$, $D(n_{max}-1) > D(n_{max})$ is satisfied.

3. The synchronous reluctance motor according to claim 1, wherein
the ratio k(n) is determined on the basis of the following expression:

$$k(n) = k(n\max) - \{a \times (n_{max} - n)\}$$

4. The synchronous reluctance motor according to claim 1, wherein
where a number of magnetic poles of the rotor core is denoted by P, a number of phases of currents applied to the winding is denoted by z, and a number of the slots per the magnetic pole and per the phase is denoted by Q, the angle θ is in a range of $360°/(2 \times P \times z) < \theta \times Q < 360°/(1.25 \times P \times z)$.

5. The synchronous reluctance motor according to claim 1, wherein
where a number of magnetic poles of the rotor core is denoted by P, a number of phases of currents applied to the winding is denoted by z, and a number of the slots per the magnetic pole and per the phase is denoted by Q, when Q is equal to 3, the angle θ is in a range of $360°/(2 \times P \times z) < \theta \times Q < 360°/(1.16 \times P \times z)$.

6. The synchronous reluctance motor according to claim 1, wherein
short-side-direction opening widths of the openings become narrower as approaching the outer circumferential surface of the rotor core from the cylindrical center side.

7. The synchronous reluctance motor according to claim 1, wherein
short-side-direction opening widths of the openings are narrower than widths of parts of the rotor core between the respective slits.

8. The synchronous reluctance motor according to claim 1, wherein
a cutout is provided to the outer circumferential surface of the rotor core at a part intersecting the q axis, and
an angle θs formed with respect to the cylinder center by both ends of the cutout along the outer circumferential surface of the rotor core is in a range of $\theta s < 2 \times (360°/S)$.

9. The synchronous reluctance motor according to claim 1, wherein
a sectional area of a first chamfered portion is greater than a sectional area of a second chamfered portion, the first chamfered portion being a part of the rotor core between a perpendicular to the outer circumferential surface of the rotor core from a midpoint of an arc of each opening along the outer circumferential surface of the rotor core, and an extension line along the inner edge of the opening to the outer circumferential surface of the rotor core, the second chamfered portion being a part of the rotor core between the perpendicular to the outer circumferential surface of the rotor core from the midpoint and an extension line along the outer edge of the opening to the outer circumferential surface of the rotor core.

10. The synchronous reluctance motor according to claim 9, wherein
the sectional area of the first chamfered portion corresponding to the slit closer to the q axis is set so that a ratio of the sectional area of the first chamfered portion to the sectional area of the second chamfered portion becomes greater.

11. The synchronous reluctance motor according to claim 1, wherein
a rib is provided so as to divide the opening into a plurality of parts.

12. The synchronous reluctance motor according to claim 2, wherein
the ratio k(n) is determined on the basis of the following expression:

$$k(n) = k(n_{max}) - \{a \times (n_{max} - n)\}$$

13. The synchronous reluctance motor according to claim 2, wherein
where a number of magnetic poles of the rotor core is denoted by P, a number of phases of currents applied to the winding is denoted by z, and a number of the slots per the magnetic pole and per the phase is denoted by Q, the angle θ is in a range of $360°/(2 \times P \times z) < \theta \times Q < 360°/(1.25 \times P \times z)$.

14. The synchronous reluctance motor according to claim 3, wherein
where a number of magnetic poles of the rotor core is denoted by P, a number of phases of currents applied to the winding is denoted by z, and a number of the slots per the magnetic pole and per the phase is denoted by Q, the angle θ is in a range of $360°/(2 \times P \times z) < \theta \times Q < 360°/(1.25 \times P \times z)$.

15. The synchronous reluctance motor according to claim 2, wherein
where a number of magnetic poles of the rotor core is denoted by P, a number of phases of currents applied to the winding is denoted by z, and a number of the slots per the magnetic pole and per the phase is denoted by Q, when Q is equal to 3, the angle θ is in a range of $360°/(2\times P\times z) < \theta \times Q < 360°/(1.16\times P\times z)$.

16. The synchronous reluctance motor according to claim 3, wherein
where a number of magnetic poles of the rotor core is denoted by P, a number of phases of currents applied to the winding is denoted by z, and a number of the slots per the magnetic pole and per the phase is denoted by Q, when Q is equal to 3, the angle θ is in a range of $360°/(2\times P\times z) < \theta \times Q < 360°/(1.16\times P\times z)$.

17. The synchronous reluctance motor according to claim 2, wherein
a cutout is provided to the outer circumferential surface of the rotor core at a part intersecting the q axis, and
an angle θs formed with respect to the cylinder center by both ends of the cutout along the outer circumferential surface of the rotor core is in a range of $\theta s < 2\times(360°/S)$.

18. The synchronous reluctance motor according to claim 3, wherein
a cutout is provided to the outer circumferential surface of the rotor core at a part intersecting the q axis, and
an angle θs formed with respect to the cylinder center by both ends of the cutout along the outer circumferential surface of the rotor core is in a range of $\theta s < 2\times(360°/S)$.

19. The synchronous reluctance motor according to claim 2, wherein
a sectional area of a first chamfered portion is greater than a sectional area of a second chamfered portion, the first chamfered portion being a part of the rotor core between a perpendicular to the outer circumferential surface of the rotor core from a midpoint of an arc of each opening along the outer circumferential surface of the rotor core, and an extension line along the inner edge of the opening to the outer circumferential surface of the rotor core, the second chamfered portion being a part of the rotor core between the perpendicular to the outer circumferential surface of the rotor core from the midpoint and an extension line along the outer edge of the opening to the outer circumferential surface of the rotor core.

20. The synchronous reluctance motor according to claim 3, wherein
a sectional area of a first chamfered portion is greater than a sectional area of a second chamfered portion, the first chamfered portion being a part of the rotor core between a perpendicular to the outer circumferential surface of the rotor core from a midpoint of an arc of each opening along the outer circumferential surface of the rotor core, and an extension line along the inner edge of the opening to the outer circumferential surface of the rotor core, the second chamfered portion being a part of the rotor core between the perpendicular to the outer circumferential surface of the rotor core from the midpoint and an extension line along the outer edge of the opening to the outer circumferential surface of the rotor core.

* * * * *